United States Patent
Wang et al.

(10) Patent No.: US 12,426,115 B2
(45) Date of Patent: Sep. 23, 2025

(54) METHOD FOR ACQUIRING NETWORK RESOURCE, DEVICE, AND SYSTEM

(71) Applicant: Honor Device Co., Ltd., Shenzhen (CN)

(72) Inventors: Lei Wang, Shenzhen (CN); Mei Wu, Shenzhen (CN); Chao Xue, Shenzhen (CN); Fuxiang Qiao, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 404 days.

(21) Appl. No.: 17/922,178

(22) PCT Filed: Mar. 9, 2021

(86) PCT No.: PCT/CN2021/079635
§ 371 (c)(1),
(2) Date: Oct. 28, 2022

(87) PCT Pub. No.: WO2021/238331
PCT Pub. Date: Dec. 2, 2021

(65) Prior Publication Data
US 2023/0180325 A1   Jun. 8, 2023

(30) Foreign Application Priority Data
May 27, 2020   (CN) .......................... 202010463764.X

(51) Int. Cl.
*H04W 76/18* (2018.01)
*H04W 36/00* (2009.01)
*H04W 76/15* (2018.01)

(52) U.S. Cl.
CPC ............ *H04W 76/18* (2018.02); *H04W 36/00* (2013.01); *H04W 76/15* (2018.02)

(58) Field of Classification Search
CPC ..... H04W 76/18; H04W 36/00; H04W 76/15; H04W 24/04
See application file for complete search history.

(56) References Cited

U.S. PATENT DOCUMENTS 9,338,740 B2   5/2016   Guo et al.
9,585,054 B2   2/2017   Ahmad et al.
(Continued)

FOREIGN PATENT DOCUMENTS

CN   102348253 A   2/2012
CN   102883374 A   1/2013
(Continued)

OTHER PUBLICATIONS

Huawei, HiSilicon, "Proposal of Key Issue: UE driven analytics for network (re)access and handover optimization", 3GPP TSG-SA WG2 Meeting #135, S2-1909290, Split, Croatia, Oct. 14-Oct. 18, 2019, 2 pages.

*Primary Examiner* — Mounir Moutaouakil
(74) *Attorney, Agent, or Firm* — Rimon PC

(57) ABSTRACT

The present application discloses a method for acquiring a network resource, device, and system, relating to the field of communications technologies, and enabling logical use of a communication resource while improving the success ratio of communication resource requests. In the present application, a terminal device may request a communication resource from a second network device according to action indication information and/or statistical information sent by a first network device. The terminal device chooses, according to an actual status, to lower a resource request level or to implement other measures matching an actual current status of a network, and then requests a communication resource from the second network device, thereby making (Continued)

logical use of a communication resource while improving the success ratio of communication resource requests.

20 Claims, 9 Drawing Sheets

(56) References Cited

U.S. PATENT DOCUMENTS

| | | | |
|---|---|---|---|
| 9,900,815 B2 * | 2/2018 | Jung | H04W 48/18 |
| 11,438,950 B2 | 9/2022 | Jiang | |
| 11,895,537 B2 * | 2/2024 | Patil | H04W 28/10 |
| 12,192,943 B2 * | 1/2025 | Johansson | H04W 48/18 |
| 12,213,065 B2 * | 1/2025 | Kuge | H04W 60/06 |
| 12,273,844 B2 * | 4/2025 | Sethi | H04W 60/04 |
| 2009/0196168 A1 | 8/2009 | Aydin et al. | |
| 2009/0270103 A1 * | 10/2009 | Pani | H04W 36/0085 455/436 |
| 2009/0311967 A1 | 12/2009 | Takase et al. | |
| 2010/0216469 A1 * | 8/2010 | Yi | H04W 48/20 455/435.3 |
| 2018/0376444 A1 | 12/2018 | Kim et al. | |
| 2020/0162919 A1 | 5/2020 | Velev et al. | |
| 2021/0083956 A1 | 3/2021 | Fan et al. | |

FOREIGN PATENT DOCUMENTS

| | | | | |
|---|---|---|---|---|
| CN | 103229533 A | | 7/2013 | |
| CN | 104471975 A | | 3/2015 | |
| CN | 104488326 A | | 4/2015 | |
| CN | 106465320 A | * | 2/2017 | H04W 52/383 |
| EP | 2906014 A2 | | 8/2015 | |
| EP | 3606116 A1 | | 2/2020 | |
| EP | 3858090 B1 | * | 2/2022 | H04W 36/0022 |
| WO | WO-2011116694 A1 | * | 9/2011 | H04W 36/0055 |
| WO | 2019158777 A1 | | 8/2019 | |
| WO | 2019232698 A1 | | 12/2019 | |

* cited by examiner (a)

(b)

Cause value (octet)

Bit

| 8 | 7 | 6 | 5 | 4 | 3 | 2 | 1 | |
|---|---|---|---|---|---|---|---|---|
| 0 | 0 | 0 | 0 | 0 | 0 | 1 | 1 | Invalid terminal device |
| 0 | 0 | 0 | 0 | 0 | 1 | 1 | 0 | Invalid ME |
| 0 | 0 | 0 | 0 | 0 | 1 | 1 | 1 | A network cannot recognize a terminal device |
| 0 | 0 | 0 | 0 | 1 | 0 | 0 | 1 | A user is logged out |
| 0 | 0 | 0 | 0 | 1 | 0 | 1 | 1 | A PLMN service is not allowed |
| 0 | 0 | 0 | 0 | 1 | 1 | 0 | 0 | A routing area is not allowed |
| 0 | 0 | 0 | 0 | 1 | 1 | 0 | 1 | Roaming is not allowed in a routing area |
| 0 | 0 | 0 | 0 | 1 | 1 | 1 | 1 | There is no appropriate cell in a routing area |

FIG. 8

000000# METHOD FOR ACQUIRING NETWORK RESOURCE, DEVICE, AND SYSTEM

CROSS-REFERECNE TO RELATED APPLICATIONS

This application is a national stage of International Application No. PCT/CN2021/079635, filed on Mar. 9, 2021, which claims priority to Chinese Patent Application No. 202010463764.X, on May 27, 2020, both of which are incorporated herein by reference in their entireties.

TECHNICAL FIELD

The present application relates to the field of communications technologies, and in particular, to a method for acquiring a network resource, a device, and a system.

BACKGROUND

A terminal device may fail when requesting a network resource, for example, when requesting access to a network, requesting registration with the network, or requesting a resource for transmitting service data. The cause of a failure may be occasional or may be an insufficient resource, an inadequate capability, a mismatch with a capability of the terminal device, poor compatibility or an authentication failure on a network side.

When a request from the terminal device is rejected, the terminal device usually keeps retrying or takes a next step in the solution measures based on the cause of a failure returned by a network device to attempt to reacquire a network resource.

However, for an occasional failure, the problem may be solved through retries. However, for the above-mentioned causes such as an insufficient resource, an inadequate capability, a mismatch with a capability of the terminal device, poor compatibility or an authentication failure on the network side, the problem obviously cannot be solved through retries. In addition, the cause of a failure returned by the network device to the terminal device is usually rather general (for example, a radio resource control (radio resource control, RRC) setup request is rejected). As a result, the terminal device cannot understand the cause of a failure in a specific and detailed way, and cannot take appropriate solution measures to solve the problem that resources fail to be acquired.

SUMMARY

The present application provides a method for acquiring a network resource, device, and system, enabling logical use of a communication resource while improving the success ratio of communication resource requests.

To achieve the foregoing objective, the following technical solutions are used in the present application:

According to a first aspect, a method for acquiring a network resource is provided, including: sending, by a first network device, first information including action indication information and/or statistical information to a terminal device, where the action indication information is used for requesting a communication resource from a second network device after the terminal device lowers a resource request level or is used for acquiring a communication resource by the terminal device through retries when a communication resource request fails, and the statistical information is at least used for representing one or more of the following: a status of receiving and processing a communication resource request by the second network device within a preset time period, and a status of a network failure of the second network device within the preset time period; and sending, by the terminal device, a first communication resource request to the second network device according to the first information, where the first communication resource request is used for acquiring a first communication resource.

In the foregoing technical solution provided in the first aspect, the terminal device requests a communication resource from the second network device according to the action indication information and/or the statistical information sent by the first network device. The terminal device chooses, according to an actual status, to lower a resource request level or to implement other measures matching an actual current status of a network, and then requests a communication resource from the second network device, thereby making logical use of a communication resource while improving the success ratio of communication resource requests.

In a possible implementation, the first information includes the action indication information, and a first action indicated by the action indication information includes: acquiring a communication resource through retries, or sending the first communication resource request to the second network device after one or more of the following operations are performed: lowering a capability of the terminal device, turning off one or more functions of the terminal device, changing a cell, changing an access technology or changing a parameter of the communication resource request; and the sending, by the terminal device, a first communication resource request to the second network device according to the first information includes: sending, by the terminal device, the first communication resource request to the second network device according to the first action indicated by the action indication information. The terminal device requests a communication resource from the second network device according to the first action of acquiring a communication resource through retries or lowering a resource request level indicated by the action indication information from the first network device. The terminal device requests a communication resource from the second network device according to an actual status, thereby making logical use of a communication resource while improving the success ratio of communication resource requests.

In a possible implementation, the first information includes the statistical information and does not include the action indication information, and the sending, by the terminal device, a first communication resource request to the second network device according to the first information includes: determining, by the terminal device according to the statistical information, to perform the first action, where the first action includes: acquiring a communication resource through retries, or sending the first communication resource request to the second network device after one or more of the following operations are performed: lowering a capability of the terminal device, turning off one or more functions of the terminal device, changing a cell, changing an access technology or changing a parameter of the communication resource request. The terminal device requests a communication resource from the second network device according to the first action of acquiring a communication resource through retries or lowering a resource request level determined by the statistical information from the first network device. The terminal device requests a communication resource from the second network device according to an actual status, thereby making logical use of a communication resource while improving the success ratio of communication resource requests.

In a possible implementation, the sending, by a first network device, first information to a terminal device includes: sending, by the first network device, the first information to the terminal device through a system message, where the system message includes a master information block MIB message or a system information block SIB message, and the first information further includes a list of cells accessible by the terminal device. The present application supports that the first network device sends the action indication information and/or the statistical information to the terminal device through the system message, thereby improving a success ratio that the terminal device requests a communication resource from the second network device for the first time.

In a possible implementation, the sending, by a first network device, first information to a terminal device includes: sending, by the first network device, the first information to the terminal device when the second network device rejects a third communication resource request of the terminal device, where the third communication resource request is used for acquiring a third communication resource, and the third communication resource and the first communication resource are used for providing the same communication service. The present application supports that the first network device sends the action indication information and/or the statistical information to the terminal device when the second network device rejects a communication resource request of the terminal device, thereby improving a success ratio that the terminal device requests a communication resource from the second network device again after the request fails.

In a possible implementation, the first information further includes the statistical information, and the foregoing method further includes: in a case that the first communication resource request is rejected by the second network device, performing, by the terminal device according to the statistical information, a second action, and sending a second communication resource request to the second network device, where the second communication resource request is used for acquiring a second communication resource, and the second communication resource and the first communication resource are used for providing the same communication service, where the second action includes one or more of lowering a capability of the terminal device, turning off one or more functions of the terminal device, changing a cell, changing an access technology or changing a parameter of the communication resource request. The present application supports that a communication resource is requested from the second network device based on the statistical information from the first network device when the second network device rejects a communication resource request of the terminal device, thereby improving a success ratio that the terminal device requests a communication resource from the second network device again after the request fails.

In a possible implementation, the performing, by the terminal device according to the statistical information, a second action, and sending a second communication resource request to the second network device includes: determining, by the terminal device, a failure type of the second network device according to the statistical information; in a case that the failure type represents that the second network device has neither a hardware failure nor a software failure, sending, by the terminal device, the second communication resource request to the second network device according to a preset period; and in a case that the failure type represents that the second network device has a hardware failure or a software failure, performing, by the terminal device, the second action according to the failure type, and sending the second communication resource request to the second network device. The terminal device requests a communication resource from the second network device according to the first action of acquiring a communication resource through retries or lowering a resource request level determined by the statistical information from the first network device. The terminal device requests a communication resource from the second network device according to an actual status, thereby making logical use of a communication resource while improving the success ratio of communication resource requests.

In a possible implementation, the receiving, by a terminal device, first information from a first network device includes: receiving, by the terminal device, the first information from the first network device when the terminal device fails to acquire a third communication resource through the third communication resource request, where the third communication resource and the first communication resource are used for providing the same communication service. The present application supports that a communication resource is requested from the second network device based on the action indication information and/or the statistical information from the first network device when the second network device rejects a communication resource request of the terminal device, thereby improving a success ratio that the terminal device requests a communication resource from the second network device again after the request fails.

In a possible implementation, the first information further includes a cause value used for representing a cause why the second network device rejects the third communication resource request. The present application supports that after a request fails, the terminal device chooses, according to the cause value from the first network device in combination with the action indication information and/or the statistical information, to acquire a communication resource through retries or lower a resource request level to request a communication resource from the second network device. The terminal device requests a communication resource from the second network device according to a status of an actual network failure, thereby making logical use of a communication resource while improving the success ratio of communication resource requests.

In a possible implementation, the first information includes the statistical information, and the foregoing method further includes: in a case that the terminal device fails to acquire the first communication resource through the first communication resource request, performing, by the terminal device according to the statistical information and the cause value, a third action, and sending a fourth communication resource request to the second network device, where the fourth communication resource request is used for acquiring a fourth communication resource, and the fourth communication resource and the first communication resource are used for providing the same communication service, where the third action includes one or more of lowering a capability of the terminal device, turning off one or more functions of the terminal device, changing a cell, changing an access technology or changing a parameter of the communication resource request. The present application supports that after a request fails, the terminal device chooses, according to the cause value from the first network device and the statistical information, to acquire a communication resource through retries or lower a resource request level to request a communication resource from the second network device. The terminal device requests a communication resource from the second network device according to a status of an actual network failure, thereby making logical use of a communication resource while improving the success ratio of communication resource requests.

In a possible implementation, the performing, by the terminal device according to the statistical information and the cause value, a third action, and sending a fourth communication resource request to the second network device includes: determining, by the terminal device, the failure type of the second network device according to the statistical information and the cause value; in a case that the failure type represents that the second network device has neither a hardware failure nor a software failure, sending, by the terminal device, the fourth communication resource request to the second network device according to a preset period; in a case that the failure type represents that the second network device has a hardware failure or a software failure, performing, by the terminal device, the third action according to the failure type; and sending, by the terminal device, the fourth communication resource request to the second network device. The present application supports that after a request fails, the terminal device chooses, according to the cause value from the first network device and the statistical information, to acquire a communication resource through retries or lower a resource request level to request a communication resource from the second network device. The terminal device requests a communication resource from the second network device according to a status of an actual network failure, thereby making logical use of a communication resource while improving the success ratio of communication resource requests.

In a possible implementation, before the sending, by a first network device, first information to a terminal device, the foregoing method further includes: obtaining, by the first network device, the first information according to historical data of receiving and processing a communication resource request by the second network device within the preset time period. The second network device generates the first information according to the status of receiving and processing a communication resource request by the second network device within the preset time period. The terminal device chooses, according to an actual status, to lower a resource request level or to implement other measures matching an actual current status of a network, and then requests a communication resource from the second network device, thereby making logical use of a communication resource while improving the success ratio of communication resource requests.

In a possible implementation, the statistical information includes at least one piece of the following information within the preset time period: a count of terminal devices that send a communication resource request to the second network device; a count of terminal devices whose communication resource request is rejected by the second network device; a ratio of terminal devices whose communication resource request is rejected by the second network device; a count of communication resource requests received by the second network device; a count of communication resource requests rejected by the second network device; a ratio of communication resource requests rejected by the second network device; an average request time distance of receiving a communication resource request by the second network device; an average rejection time distance of rejecting a communication resource request by the second network device; an average request time interval of communication resource requests received by the second network device; or an average rejection time interval of rejecting communication resource requests by the second network device. The first network device sends one or more of the statistical information to the terminal device, so that after taking measures matching an actual current status of a network, the terminal device requests a communication resource from the second network device, thereby making logical use of a communication resource while improving the success ratio of communication resource requests.

In a possible implementation, the first action indicated by the action indication information is to acquire a communication resource through retries, and the statistical information is further used for representing a success ratio of acquiring a communication resource by the terminal device through retries. The first network device sends the success ratio of acquiring a communication resource by the terminal device through retries to the terminal device, so that the terminal device determines whether to acquire a communication resource through retries and the terminal device comprehensively considers measures to acquire a communication resource.

In a possible implementation, the statistical information includes a severity assessment value of the network failure of the second network device within the preset time period. The first network device sends the severity assessment value of the network failure of the second network device to the terminal device, so that the terminal device comprehensively considers measures to acquire a communication resource.

In a possible implementation, the severity assessment value F of the network failure of the second network device is calculated by the first network device according to the following calculation formula: $F=(\Pi_{i=2}^{M} F_i)*\mathrm{Thre}(T\_REJ\_UE\_CNT-C_3)*\mathrm{Thre}(T\_REJ\_CNT-C_4)$, where $$F_i = \left(C^{R_i - \frac{1}{2}}\right)^{C_5 *} \left(C_1^{\frac{1}{I_i}}\right)^{C_6} * \left(C_2^{\frac{1}{T_{now} - T_i}}\right)^{C_7};$$

$R_i$ is a result of processing an $i^{th}$ received communication resource request by the second network device within the preset time period, $R_i=0$ represents that the second network device accepts the $i^{th}$ communication resource request, and $R_i=1$ represents that the second network device rejects the $i^{th}$ communication resource request; $I_i$ is a time interval between the $i^{th}$ communication resource request and an $(i-1)^{th}$ communication resource request; $T_{now}$ is a current moment; $T_i$ is a moment at which the second network device receives the $i^{th}$ communication resource request; $C_3$ is a preset count threshold of terminal devices whose communication resource request is rejected for determining a network failure; $C_4$ is a threshold of a count of times that a communication resource request is rejected for determining a network failure; and C, $C_1$ and $C_2$ are constants greater than 1, $C_5$, and $C_6$ and $C_7$ are constants greater than 0.

In a possible implementation, the first network device and the second network device are the same device, and the foregoing method further includes: receiving, by the first network device, the first communication resource request from the terminal device, where the first communication resource request is used for acquiring the first communication resource; and allocating, by the first network device, first communication resource to the terminal device according to the first communication resource request. The present application supports a centralized network architecture.

In a possible implementation, the first network device is a network data analytics function NWDAF network element. The present application supports a distributed network architecture, to facilitate centralized management and analysis of a network status.

In a possible implementation, the second network device is an access network device or a core network device.

According to a second aspect, a method for acquiring a network resource is provided, including: receiving, by a terminal device, first information including action indication information and/or statistical information from a first network device, where the action indication information is used for requesting a communication resource from a second network device after the terminal device lowers a resource request level or is used for acquiring a communication resource by the terminal device through retries when a communication resource request fails, and the statistical information is at least used for representing one or more of the following: a status of receiving and processing a communication resource request by the second network device within a preset time period, and a status of a network failure of the second network device within the preset time period; and sending, by the terminal device, a first communication resource request to the second network device according to the first information, where the first communication resource request is used for acquiring a first communication resource.

In the foregoing technical solution provided in the second aspect, the terminal device requests a communication resource from the second network device according to the action indication information and/or the statistical information sent by the first network device. The terminal device chooses, according to an actual status, to lower a resource request level or to implement other measures matching an actual current status of a network, and then requests a communication resource from the second network device, thereby making logical use of a communication resource while improving the success ratio of communication resource requests.

In a possible implementation, the first information includes the action indication information, and a first action indicated by the action indication information includes: acquiring a communication resource through retries, or sending the first communication resource request to the second network device after one or more of the following operations are performed: lowering a capability of the terminal device, turning off one or more functions of the terminal device, changing a cell, changing an access technology or changing a parameter of the communication resource request; and the sending, by the terminal device, a first communication resource request to the second network device according to the first information includes: sending, by the terminal device, the first communication resource request to the second network device according to the first action indicated by the action indication information. The terminal device requests a communication resource from the second network device according to the first action of acquiring a communication resource through retries or lowering a resource request level indicated by the action indication information from the first network device. The terminal device requests a communication resource from the second network device according to an actual status, thereby making logical use of a communication resource while improving the success ratio of communication resource requests.

In a possible implementation, the first information includes the statistical information and does not include the action indication information, and the sending, by the terminal device, a first communication resource request to the second network device according to the first information includes: determining, by the terminal device according to the statistical information, to perform the first action, where the first action includes: acquiring a communication resource through retries, or sending the first communication resource request to the second network device after one or more of the following operations are performed: lowering a capability of the terminal device, turning off one or more functions of the terminal device, changing a cell, changing an access technology or changing a parameter of the communication resource request. The terminal device requests a communication resource from the second network device according to the first action of acquiring a communication resource through retries or lowering a resource request level determined by the statistical information from the first network device. The terminal device requests a communication resource from the second network device according to an actual status, thereby making logical use of a communication resource while improving the success ratio of communication resource requests.

In a possible implementation, the receiving, by a terminal device, first information from a first network device includes: receiving, by the terminal device, a system message from the first network device, where the system message includes the first information, the system message includes a master information block (master information block, MIB) message or a system information block (system information block, SIB) message, and the first information further includes a list of cells accessible by the terminal device. The present application supports that a communication resource is requested from the second network device based on the action indication information and/or the statistical information carried in the system message from the first network device, thereby improving a success ratio that the terminal device requests a communication resource from the second network device for the first time.

In a possible implementation, the first information further includes the statistical information, and the foregoing method further includes: in a case that the first communication resource request is rejected by the second network device, performing, by the terminal device according to the statistical information, a second action, and sending a second communication resource request to the second network device, where the second communication resource request is used for acquiring a second communication resource, and the second communication resource and the first communication resource are used for providing the same communication service, where the second action includes one or more of lowering a capability of the terminal device, turning off one or more functions of the terminal device, changing a cell, changing an access technology or changing a parameter of the communication resource request. The present application supports that a communication resource is requested from the second network device based on the statistical information from the first network device when the second network device rejects a communication resource request of the terminal device, thereby improving a success ratio that the terminal device requests a communication resource from the second network device again after the request fails.

In a possible implementation, the performing, by the terminal device according to the statistical information, a second action, and sending a second communication resource request to the second network device includes: determining, by the terminal device, a failure type of the second network device according to the statistical information; in a case that the failure type represents that the second network device has neither a hardware failure nor a software failure, sending, by the terminal device, the second communication resource request to the second network device according to a preset period; and in a case that the failure type represents that the second network device has a hardware failure or a software failure, performing, by the terminal device, the second action according to the failure type, and sending the second communication resource request to the second network device. The terminal device requests a communication resource from the second network device according to the first action of acquiring a communication resource through retries or lowering a resource request level determined by the statistical information from the first network device. The terminal device requests a communication resource from the second network device according to an actual status, thereby making logical use of a communication resource while improving the success ratio of communication resource requests.

In a possible implementation, the receiving, by a terminal device, first information from a first network device includes: receiving, by the terminal device, the first information from the first network device when the terminal device fails to acquire a third communication resource through the third communication resource request, where the third communication resource and the first communication resource are used for providing the same communication service. The present application supports that a communication resource is requested from the second network device based on the action indication information and/or the statistical information from the first network device when the second network device rejects a communication resource request of the terminal device, thereby improving a success ratio that the terminal device requests a communication resource from the second network device again after the request fails.

In a possible implementation, the first information further includes a cause value used for representing a cause why the second network device rejects the third communication resource request. The present application supports that after a request fails, the terminal device chooses, according to the cause value from the first network device in combination with the action indication information and/or the statistical information, to acquire a communication resource through retries or lower a resource request level to request a communication resource from the second network device. The terminal device requests a communication resource from the second network device according to a status of an actual network failure, thereby making logical use of a communication resource while improving the success ratio of communication resource requests.

In a possible implementation, the first information includes the statistical information, and the foregoing method further includes: in a case that the terminal device fails to acquire the first communication resource through the first communication resource request, performing, by the terminal device according to the statistical information and the cause value, a third action, and sending a fourth communication resource request to the second network device, where the fourth communication resource request is used for acquiring a fourth communication resource, and the fourth communication resource and the first communication resource are used for providing the same communication service, where the third action includes one or more of lowering a capability of the terminal device, turning off one or more functions of the terminal device, changing a cell, changing an access technology or changing a parameter of the communication resource request. The present application supports that after a request fails, the terminal device chooses, according to the cause value from the first network device and the statistical information, to acquire a communication resource through retries or lower a resource request level to request a communication resource from the second network device. The terminal device requests a communication resource from the second network device according to a status of an actual network failure, thereby making logical use of a communication resource while improving the success ratio of communication resource requests.

In a possible implementation, the performing, by the terminal device according to the statistical information and the cause value, a third action, and sending a fourth communication resource request to the second network device includes: determining, by the terminal device, the failure type of the second network device according to the statistical information and the cause value; in a case that the failure type represents that the second network device has neither a hardware failure nor a software failure, sending, by the terminal device, the fourth communication resource request to the second network device according to a preset period; in a case that the failure type represents that the second network device has a hardware failure or a software failure, performing, by the terminal device, the third action according to the failure type; and sending, by the terminal device, the fourth communication resource request to the second network device. The present application supports that after a request fails, the terminal device chooses, according to the cause value from the first network device and the statistical information, to acquire a communication resource through retries or lower a resource request level to request a communication resource from the second network device. The terminal device requests a communication resource from the second network device according to a status of an actual network failure, thereby making logical use of a communication resource while improving the success ratio of communication resource requests.

In a possible implementation, the statistical information includes at least one piece of the following information within the preset time period: a count of terminal devices that send a communication resource request to the second network device; a count of terminal devices whose communication resource request is rejected by the second network device; a ratio of terminal devices whose communication resource request is rejected by the second network device; a count of communication resource requests received by the second network device; a count of communication resource requests rejected by the second network device; a ratio of communication resource requests rejected by the second network device; an average request time distance of receiving a communication resource request by the second network device; an average rejection time distance of rejecting a communication resource request by the second network device; an average request time interval of communication resource requests received by the second network device; or an average rejection time interval of rejecting communication resource requests by the second network device. After taking, based on one or more of the statistical information from the first network device, measures matching an actual current status of a network, the terminal device may request a communication resource from the second network device, thereby making logical use of a communication resource while improving the success ratio of communication resource requests.

In a possible implementation, the first action indicated by the action indication information is to acquire a communication resource through retries, and the statistical information is further used for representing a success ratio of acquiring a communication resource by the terminal device through retries. The terminal device may determine, based on the success ratio of acquiring a communication resource by the terminal device through retries from the first network device, whether to acquire a communication resource through retries and the terminal device comprehensively considers measures to acquire a communication resource.

In a possible implementation, the statistical information includes a severity assessment value of the network failure of the second network device within the preset time period. The terminal device may comprehensively consider, based on the severity assessment value of the network failure of the second network device from the first network device, measures to acquire a communication resource.

In a possible implementation, the first network device and the second network device are the same device. The present application supports a centralized network architecture.

In a possible implementation, the first network device is a network data analytics function NWDAF network element. The present application supports a distributed network architecture, to facilitate centralized management and analysis of a network status.

In a possible implementation, the second network device is an access network device or a core network device.

According to a third aspect, a method for acquiring a network resource is provided, including: sending, by a first network device, first information including action indication information and/or statistical information to a terminal device, where the action indication information is used for requesting a communication resource from a second network device after the terminal device lowers a resource request level or is used for acquiring a communication resource by the terminal device through retries when a communication resource request fails, and the statistical information is at least used for representing one or more of the following: a status of receiving and processing a communication resource request by the second network device within a preset time period, and a status of a network failure of the second network device within the preset time period.

In the foregoing technical solution provided in the third aspect, the first network device sends the action indication information and/or the statistical information to the terminal device. The terminal device chooses, according to an actual status, to lower a resource request level or to implement other measures matching an actual current status of a network, and then requests a communication resource from the second network device, thereby making logical use of a communication resource while improving the success ratio of communication resource requests.

In a possible implementation, the first information includes the action indication information, and a first action indicated by the action indication information includes: acquiring a communication resource through retries, or sending a first communication resource request to the second network device after one or more of the following operations are performed: lowering a capability of the terminal device, turning off one or more functions of the terminal device, changing a cell, changing an access technology or changing a parameter of the communication resource request; and the sending, by the terminal device, a first communication resource request to the second network device according to the first information includes: sending, by the terminal device, the first communication resource request to the second network device according to the first action indicated by the action indication information. The terminal device requests a communication resource from the second network device according to the first action of acquiring a communication resource through retries or lowering a resource request level indicated by the action indication information from the first network device. The terminal device requests a communication resource from the second network device according to an actual status, thereby making logical use of a communication resource while improving the success ratio of communication resource requests.

In a possible implementation, the sending, by a first network device, first information to a terminal device includes: sending, by the first network device, the first information to the terminal device through a system message, where the system message includes a master information block MIB message or a system information block SIB message, and the first information further includes a list of cells accessible by the terminal device. The present application supports that the first network device sends the action indication information and/or the statistical information to the terminal device through the system message, thereby improving a success ratio that the terminal device requests a communication resource from the second network device for the first time.

In a possible implementation, the sending, by a first network device, first information to a terminal device includes: sending, by the first network device, the first information to the terminal device when the second network device rejects a third communication resource request of the terminal device, where the third communication resource request is used for acquiring a third communication resource, and the third communication resource and a first communication resource are used for providing the same communication service. The present application supports that the first network device sends the action indication information and/or the statistical information to the terminal device when the second network device rejects a communication resource request of the terminal device, thereby improving a success ratio that the terminal device requests a communication resource from the second network device again after the request fails.

In a possible implementation, before the sending, by a first network device, first information to a terminal device, the foregoing method further includes: obtaining, by the first network device, the first information according to historical data of receiving and processing a communication resource request by the second network device within the preset time period. The second network device generates the first information according to the status of receiving and processing a communication resource request by the second network device within the preset time period. The terminal device chooses, according to an actual status, to lower a resource request level or to implement other measures matching an actual current status of a network, and then requests a communication resource from the second network device, thereby making logical use of a communication resource while improving the success ratio of communication resource requests.

In a possible implementation, the statistical information includes at least one piece of the following information within the preset time period: a count of terminal devices that send a communication resource request to the second network device; a count of terminal devices whose communication resource request is rejected by the second network device; a ratio of terminal devices whose communication resource request is rejected by the second network device; a count of communication resource requests received by the second network device; a count of communication resource requests rejected by the second network device; a ratio of communication resource requests rejected by the second network device; an average request time distance of receiving a communication resource request by the second network device; an average rejection time distance of rejecting a communication resource request by the second network device; an average request time interval of communication resource requests received by the second network device; or an average rejection time interval of rejecting communication resource requests by the second network device. The first network device sends one or more of the statistical information to the terminal device, so that after taking measures matching an actual current status of a network, the terminal device requests a communication resource from the second network device, thereby making logical use of a communication resource while improving the success ratio of communication resource requests.

In a possible implementation, the first action indicated by the action indication information is to acquire a communication resource through retries, and the statistical information is further used for representing a success ratio of acquiring a communication resource by the terminal device through retries. The first network device sends the success ratio of acquiring a communication resource by the terminal device through retries to the terminal device, so that the terminal device determines whether to acquire a communication resource through retries and the terminal device comprehensively considers measures to acquire a communication resource.

In a possible implementation, the statistical information includes a severity assessment value of the network failure of the second network device within the preset time period. The first network device sends the severity assessment value of the network failure of the second network device to the terminal device, so that the terminal device comprehensively considers measures to acquire a communication resource.

In a possible implementation, the severity assessment value F of the network failure of the second network device is calculated by the first network device according to the following calculation formula: $F=(\Pi_{i=2}^{M} F_i)*Thre(T\_REJ\_UE\_CNT-C_3)*Thre(T\_REJ\_CNT-C_4)$, where $$F_i = \left(C^{R_i - \frac{1}{2}}\right)^{C_5 *\left(C_1^{\frac{1}{I^i}}\right)^{C_6} *\left(C_2^{\frac{1}{T_{now}-T_i}}\right)^{C_7}};$$

$R_i$ is a result of processing an $i^{th}$ received communication resource request by the second network device within the preset time period, $R_i=0$ represents that the second network device accepts the $i^{th}$ communication resource request, and $R_i=1$ represents that the second network device rejects the $i^{th}$ communication resource request; $I_i$ is a time interval between the $i^{th}$ communication resource request and an $(i-1)^{th}$ communication resource request; $T_{now}$ is a current moment; $T_i$ is a moment at which the second network device receives the $i^{th}$ communication resource request; $C_3$ is a preset count threshold of terminal devices whose communication resource request is rejected for determining a network failure; $C_4$ is a threshold of a count of times that a communication resource request is rejected for determining a network failure; and C, $C_1$ and $C_2$ are constants greater than 1, $C_5$, and $C_6$ and $C_7$ are constants greater than 0.

In a possible implementation, the first network device and the second network device are the same device, and the foregoing method further includes: receiving, by the first network device, the first communication resource request from the terminal device, where the first communication resource request is used for acquiring the first communication resource; and allocating, by the first network device, the first communication resource to the terminal device according to the first communication resource request. The present application supports a centralized network architecture.

In a possible implementation, the first network device is a network data analytics function NWDAF network element. The present application supports a distributed network architecture, to facilitate centralized management and analysis of a network status.

In a possible implementation, the second network device is an access network device or a core network device.

According to a fourth aspect, a terminal device is provided, including: a receiving unit, configured to receive first information including action indication information and/or statistical information from a first network device, where the action indication information is used for requesting a communication resource from a second network device after the terminal device lowers a resource request level or is used for acquiring a communication resource by the terminal device through retries when a communication resource request fails, and the statistical information is at least used for representing one or more of the following: a status of receiving and processing a communication resource request by the second network device within a preset time period, and a status of a network failure of the second network device within the preset time period; and a processing unit, configured to send a first communication resource request to the second network device according to the first information, where the first communication resource request is used for acquiring a first communication resource.

In the foregoing technical solution provided in the fourth aspect, the terminal device requests a communication resource from the second network device according to the action indication information and/or the statistical information sent by the first network device. The terminal device chooses, according to an actual status, to lower a resource request level or to implement other measures matching an actual current status of a network, and then requests a communication resource from the second network device, thereby making logical use of a communication resource while improving the success ratio of communication resource requests.

In a possible implementation, the first information includes the action indication information, and a first action indicated by the action indication information includes: acquiring a communication resource through retries, or sending the first communication resource request to the second network device after one or more of the following operations are performed: lowering a capability of the terminal device, turning off one or more functions of the terminal device, changing a cell, changing an access technology or changing a parameter of the communication resource request; and the sending, by the terminal device, the first communication resource request to the second network device according to the first information includes: sending, by the terminal device, the first communication resource request to the second network device according to the first action indicated by the action indication information. The terminal device requests a communication resource from the second network device according to the first action of acquiring a communication resource through retries or lowering a resource request level indicated by the action indication information from the first network device. The terminal device requests a communication resource from the second network device according to an actual status, thereby making logical use of a communication resource while improving the success ratio of communication resource requests.

In a possible implementation, the first information includes the statistical information and does not include the action indication information, and the sending, by the processing unit, the first communication resource request to the second network device according to the first information includes: determining, by the processing unit according to the statistical information, to perform the first action, where the first action includes: acquiring a communication resource through retries, or sending the first communication resource request to the second network device after one or more of the following operations are performed: lowering a capability of the terminal device, turning off one or more functions of the terminal device, changing a cell, changing an access technology or changing a parameter of the communication resource request. The terminal device requests a communication resource from the second network device according to the first action of acquiring a communication resource through retries or lowering a resource request level determined by the statistical information from the first network device. The terminal device requests a communication resource from the second network device according to an actual status, thereby making logical use of a communication resource while improving the success ratio of communication resource requests.

In a possible implementation, the receiving, by the receiving unit, the first information from the first network device includes: receiving, by the receiving unit, a system message from the first network device, where the system message includes the first information, the system message includes a master information block MIB message or a system information block SIB message, and the first information further includes a list of cells accessible by the terminal device. The present application supports that a communication resource is requested from the second network device based on the action indication information and/or the statistical information carried in the system message from the first network device, thereby improving a success ratio that the terminal device requests a communication resource from the second network device for the first time.

In a possible implementation, the terminal device further includes a sending unit; and the first information further includes the statistical information, and the processing unit is further configured to: in a case that the first communication resource request is rejected by the second network device, perform, according to the statistical information, a second action, and send a second communication resource request to the second network device by using the sending unit, where the second communication resource request is used for acquiring a second communication resource, and the second communication resource and the first communication resource are used for providing the same communication service, where the second action includes one or more of lowering a capability of the terminal device, turning off one or more functions of the terminal device, changing a cell, changing an access technology or changing a parameter of the communication resource request. The present application supports that a communication resource is requested from the second network device based on the statistical information from the first network device when the second network device rejects a communication resource request of the terminal device, thereby improving a success ratio that the terminal device requests a communication resource from the second network device again after the request fails.

In a possible implementation, the performing, by the processing unit according to the statistical information, the second action, and sending the second communication resource request to the second network device by using the sending unit includes: determining, by the processing unit, a failure type of the second network device according to the statistical information; in a case that the failure type represents that the second network device has neither a hardware failure nor a software failure, sending, by the processing unit, the second communication resource request to the second network device according to a preset period by using the sending unit; and in a case that the failure type represents that the second network device has a hardware failure or a software failure, performing, by the processing unit, the second action according to the failure type, and sending the second communication resource request to the second network device by using the sending unit. The terminal device requests a communication resource from the second network device according to the first action of acquiring a communication resource through retries or lowering a resource request level determined by the statistical information from the first network device. The terminal device requests a communication resource from the second network device according to an actual status, thereby making logical use of a communication resource while improving the success ratio of communication resource requests.

In a possible implementation, the receiving, by the receiving unit, the first information from the first network device includes: receiving, by the receiving unit, the first information from the first network device when the terminal device fails to acquire a third communication resource through a third communication resource request, where the third communication resource and the first communication resource are used for providing the same communication service. The present application supports that a communication resource is requested from the second network device based on the action indication information and/or the statistical information from the first network device when the second network device rejects a communication resource request of the terminal device, thereby improving a success ratio that the terminal device requests a communication resource from the second network device again after the request fails.

In a possible implementation, the first information further includes a cause value used for representing a cause why the second network device rejects the third communication resource request. The present application supports that after a request fails, the terminal device chooses, according to the cause value from the first network device in combination with the action indication information and/or the statistical information, to acquire a communication resource through retries or lower a resource request level to request a communication resource from the second network device. The terminal device requests a communication resource from the second network device according to a status of an actual network failure, thereby making logical use of a communication resource while improving the success ratio of communication resource requests.

In a possible implementation, the first information includes the statistical information, and the processing unit is further configured to: in a case that the terminal device fails to acquire the first communication resource through the first communication resource request, perform, according to the statistical information and the cause value, a third action, and send a fourth communication resource request to the second network device by using the sending unit, where the fourth communication resource request is used for acquiring a fourth communication resource, and the fourth communication resource and the first communication resource are used for providing the same communication service, where the third action includes one or more of lowering a capability of the terminal device, turning off one or more functions of the terminal device, changing a cell, changing an access technology or changing a parameter of the communication resource request. The present application supports that after a request fails, the terminal device chooses, according to the cause value from the first network device and the statistical information, to acquire a communication resource through retries or lower a resource request level to request a communication resource from the second network device. The terminal device requests a communication resource from the second network device according to a status of an actual network failure, thereby making logical use of a communication resource while improving the success ratio of communication resource requests.

In a possible implementation, the performing, by the processing unit according to the statistical information and the cause value, a third action, and sending a fourth communication resource request to the second network device by using the sending unit includes: determining, by the processing unit, the failure type of the second network device according to the statistical information and the cause value; in a case that the failure type represents that the second network device has neither a hardware failure nor a software failure, sending, by the processing unit, the fourth communication resource request to the second network device according to a preset period by using the sending unit; in a case that the failure type represents that the second network device has a hardware failure or a software failure, performing, by the processing unit, the third action according to the failure type; and sending, by the processing unit, the fourth communication resource request to the second network device by using the sending unit. The present application supports that after a request fails, the terminal device chooses, according to the cause value from the first network device and the statistical information, to acquire a communication resource through retries or lower a resource request level to request a communication resource from the second network device. The terminal device requests a communication resource from the second network device according to a status of an actual network failure, thereby making logical use of a communication resource while improving the success ratio of communication resource requests.

In a possible implementation, the statistical information includes at least one piece of the following information within the preset time period: a count of terminal devices that send a communication resource request to the second network device; a count of terminal devices whose communication resource request is rejected by the second network device; a ratio of terminal devices whose communication resource request is rejected by the second network device; a count of communication resource requests received by the second network device; a count of communication resource requests rejected by the second network device; a ratio of communication resource requests rejected by the second network device; an average request time distance of receiving a communication resource request by the second network device; an average rejection time distance of rejecting a communication resource request by the second network device; an average request time interval of communication resource requests received by the second network device; or an average rejection time interval of rejecting communication resource requests by the second network device. After taking, based on one or more of the statistical information from the first network device, measures matching an actual current status of a network, the terminal device may request a communication resource from the second network device, thereby making logical use of a communication resource while improving the success ratio of communication resource requests.

In a possible implementation, the first action indicated by the action indication information is to acquire a communication resource through retries, and the statistical information is further used for representing a success ratio of acquiring a communication resource by the terminal device through retries. The terminal device may determine, based on the success ratio of acquiring a communication resource by the terminal device through retries from the first network device, whether to acquire a communication resource through retries and the terminal device comprehensively considers measures to acquire a communication resource.

In a possible implementation, the statistical information includes a severity assessment value of the network failure of the second network device within the preset time period. The terminal device may comprehensively consider, based on the severity assessment value of the network failure of the second network device from the first network device, measures to acquire a communication resource.

In a possible implementation, the first network device and the second network device are the same device. The present application supports a centralized network architecture.

In a possible implementation, the first network device is a network data analytics function NWDAF network element. The present application supports a distributed network architecture, to facilitate centralized management and analysis of a network status.

In a possible implementation, the second network device is an access network device or a core network device.

According to a fifth aspect, a first network device is provided, including: a sending unit, configured to send first information including action indication information and/or statistical information to a terminal device, where the action indication information is used for requesting a communication resource from a second network device after the terminal device lowers a resource request level or is used for acquiring a communication resource by the terminal device through retries when a communication resource request fails, and the statistical information is at least used for representing one or more of the following: a status of receiving and processing a communication resource request by the second network device within a preset time period, and a status of a network failure of the second network device within the preset time period.

In the foregoing technical solution provided in the fifth aspect, the first network device sends the action indication information and/or the statistical information to the terminal device. The terminal device chooses, according to an actual status, to lower a resource request level or to implement other measures matching an actual current status of a network, and then requests a communication resource from the second network device, thereby making logical use of a communication resource while improving the success ratio of communication resource requests.

In a possible implementation, the first information includes the action indication information, and a first action indicated by the action indication information includes: acquiring a communication resource through retries, or sending the first communication resource request to the second network device after one or more of the following operations are performed: lowering a capability of the terminal device, turning off one or more functions of the terminal device, changing a cell, changing an access technology or changing a parameter of the communication resource request; and the sending, by the terminal device, the first communication resource request to the second network device according to the first information includes: sending, by the terminal device, the first communication resource request to the second network device according to the first action indicated by the action indication information. The terminal device requests a communication resource from the second network device according to the first action of acquiring a communication resource through retries or lowering a resource request level indicated by the action indication information from the first network device. The terminal device requests a communication resource from the second network device according to an actual status, thereby making logical use of a communication resource while improving the success ratio of communication resource requests.

In a possible implementation, the sending, by the sending unit, the first information to the terminal device includes: sending, by the sending unit, the first information to the terminal device through a system message, where the system message includes a master information block MIB message or a system information block SIB message, and the first information further includes a list of cells accessible by the terminal device. The present application supports that the first network device sends the action indication information and/or the statistical information to the terminal device through the system message, thereby improving a success ratio that the terminal device requests a communication resource from the second network device for the first time.

In a possible implementation, the sending, by the sending unit, the first information to the terminal device includes: sending, by the sending unit, the first information to the terminal device when the second network device rejects a third communication resource request of the terminal device, where the third communication resource request is used for acquiring a third communication resource, and the third communication resource and a first communication resource are used for providing the same communication service. The present application supports that the first network device sends the action indication information and/or the statistical information to the terminal device when the second network device rejects a communication resource request of the terminal device, thereby improving a success ratio that the terminal device requests a communication resource from the second network device again after the request fails.

In a possible implementation, the first network device further includes: a processing unit, configured to: before the sending unit sends the first information to the terminal device, obtain the first information according to historical data of receiving and processing a communication resource request by the second network device within the preset time period. The second network device generates the first information according to the status of receiving and processing a communication resource request by the second network device within the preset time period. The terminal device chooses, according to an actual status, to lower a resource request level or to implement other measures matching an actual current status of a network, and then requests a communication resource from the second network device, thereby making logical use of a communication resource while improving the success ratio of communication resource requests.

In a possible implementation, the statistical information includes at least one piece of the following information within the preset time period: a count of terminal devices that send a communication resource request to the second network device; a count of terminal devices whose communication resource request is rejected by the second network device; a ratio of terminal devices whose communication resource request is rejected by the second network device; a count of communication resource requests received by the second network device; a count of communication resource requests rejected by the second network device; a ratio of communication resource requests rejected by the second network device; an average request time distance of receiving a communication resource request by the second network device; an average rejection time distance of rejecting a communication resource request by the second network device; an average request time interval of communication resource requests received by the second network device; or an average rejection time interval of rejecting communication resource requests by the second network device. The first network device sends one or more of the statistical information to the terminal device, so that after taking measures matching an actual current status of a network, the terminal device requests a communication resource from the second network device, thereby making logical use of a communication resource while improving the success ratio of communication resource requests.

In a possible implementation, the first action indicated by the action indication information is to acquire a communication resource through retries, and the statistical information is further used for representing a success ratio of acquiring a communication resource by the terminal device through retries. The first network device sends the success ratio of acquiring a communication resource by the terminal device through retries to the terminal device, so that the terminal device determines whether to acquire a communication resource through retries and the terminal device comprehensively considers measures to acquire a communication resource.

In a possible implementation, the statistical information includes a severity assessment value of the network failure of the second network device within the preset time period. The first network device sends the severity assessment value of the network failure of the second network device to the terminal device, so that the terminal device comprehensively considers measures to acquire a communication resource.

In a possible implementation, the severity assessment value F of the network failure of the second network device is calculated by the processing unit according to the following calculation formula: $F=(\Pi_{i=2}^{M} F_i)*\text{Thre}(T\_REJ\_UE\_CNT-C_3)*\text{Thre}(T\_REJ\_CNT-C_4)$, where $$F_i = \left(C^{R_i - \frac{1}{2}}\right)^{C_5 *\left(C_1^{\frac{1}{I_i}}\right)^{C_6} *\left(C_2^{\frac{1}{T_{now}-T_i}}\right)^{C_7}};$$

$R_i$ is a result of processing an $i^{th}$ received communication resource request by the second network device within the preset time period, $R_i=0$ represents that the second network device accepts the $i^{th}$ communication resource request, and $R_i=1$ represents that the second network device rejects the $i^{th}$ communication resource request; $I_i$ is a time interval between the $i^{th}$ communication resource request and an $(i-1)^{th}$ communication resource request; $T_{now}$ is a current moment; $T_i$ is a moment at which the second network device receives the $i^{th}$ communication resource request; $C_3$ is a preset count threshold of terminal devices whose communication resource request is rejected for determining a network failure; $C_4$ is a threshold of a count of times that a communication resource request is rejected for determining a network failure; and C, $C_1$ and $C_2$ are constants greater than 1, $C_5$, and $C_6$ and $C_7$ are constants greater than 0.

In a possible implementation, the first network device and the second network device are the same device, and the first network device further includes: a receiving unit, configured to: receive the first communication resource request from the terminal device, where the first communication resource request is used for acquiring the first communication resource; and allocate, by the first network device, the first communication resource to the terminal device according to the first communication resource request. The present application supports a centralized network architecture.

In a possible implementation, the first network device is a network data analytics function NWDAF network element. The present application supports a distributed network architecture, to facilitate centralized management and analysis of a network status.

In a possible implementation, the second network device is an access network device or a core network device.

According to a sixth aspect, a terminal device is provided, including: a memory, configured to store a computer program; a transceiver, configured to receive or transmit a radio signal; and a processor, configured to execute the computer program, to cause the terminal device to implement the method in any possible implementation of the second aspect.

According to a seventh aspect, a first network device is provided, including: a memory, configured to store a computer program; a transceiver, configured to receive or transmit a radio signal; and a processor, configured to execute the computer program, to cause the first network device to implement the method in any possible implementation of the third aspect.

According to an eighth aspect, a communication system is provided, including the terminal device in any possible implementation of the fourth aspect or sixth aspect, and the first network device in any possible implementation of the fifth aspect or seventh aspect.

According to a ninth aspect, a computer-readable storage medium is provided, storing computer program code, where when executed by a processor, the computer program code implements the method in any possible implementation of the first aspect, second aspect or third aspect.

According to a tenth aspect, a chip system is provided, including a processor and a memory, where the memory stores computer program code, and when executed by the processor, the computer program code implements the method in any possible implementation of the first aspect, second aspect or third aspect. The chip system may include a chip, or may include a chip and another discrete device.

According to an eleventh aspect, a computer program product is provided, where when being executed on a computer, the computer program product implements the method in any possible implementation of the first aspect, second aspect or third aspect.

BRIEF DESCRIPTION OF DRAWINGS

FIG. 8 is a schematic diagram of a correspondence relationship between a cause value and a cause according to an embodiment of the present application;

DESCRIPTION OF EMBODIMENTS

Specific embodiments of the present application are described in further detail in the following with reference to the accompanying drawings.

A method for acquiring a network resource, device, and system provided in the embodiments of the present application are applicable to a process in which a terminal device requests a communication resource from a network device (for example, a second network device), for example, applicable to a process in which the terminal device requests access to a network, requests registration with the network, or requests a resource for transmitting service data, among other processes. In the present application, the communication resource may include, but not limited to, an air interface resource, a bearer resource, a service resource, quality of service (quality of service, QoS), a permission resource or an internet protocol (internet protocol, IP) resource.

To make the embodiments of the present application more comprehensible, a communication system architecture to which the embodiments of the present application are applicable is described below.

The method for acquiring a network resource provided in the present application is applicable to various communication systems, for example, a long term evolution (long term evolution, LTE) system, an LTE frequency division duplex (frequency division duplex, FDD) system, an LTE time division duplex (time division duplex, TDD) system, a universal mobile telecommunication system (universal mobile telecommunication system, UMTS), a wireless local access network (wireless local access network, WLAN) system, a worldwide interoperability for microwave access (worldwide interoperability for microwave access, WiMAX) communication system, a future fifth generation ($5^{th}$ generation, 5G) or new radio (new radio, NR) system. The 5G mobile communication system in the present application includes a non-standalone (non-standalone, NSA) 5G mobile communication system or a standalone (standalone, SA) 5G mobile communication system. The technical solutions provided in the present application are also applicable to a future communication system, for example, a sixth generation mobile communication system. The communication system may be a Public Land Mobile Network (Public Land Mobile Network, PLMN), a device-to-device (device-to-device, D2D) communication system, a machine to machine (machine to machine, M2M) communication system, an internet of things (internet of things, IoT) communication system (including a narrow band (narrow band, NB)-IoT system), a vehicle-to-everything communication system or another communication system. This is not limited in the present application.

Figure 1:
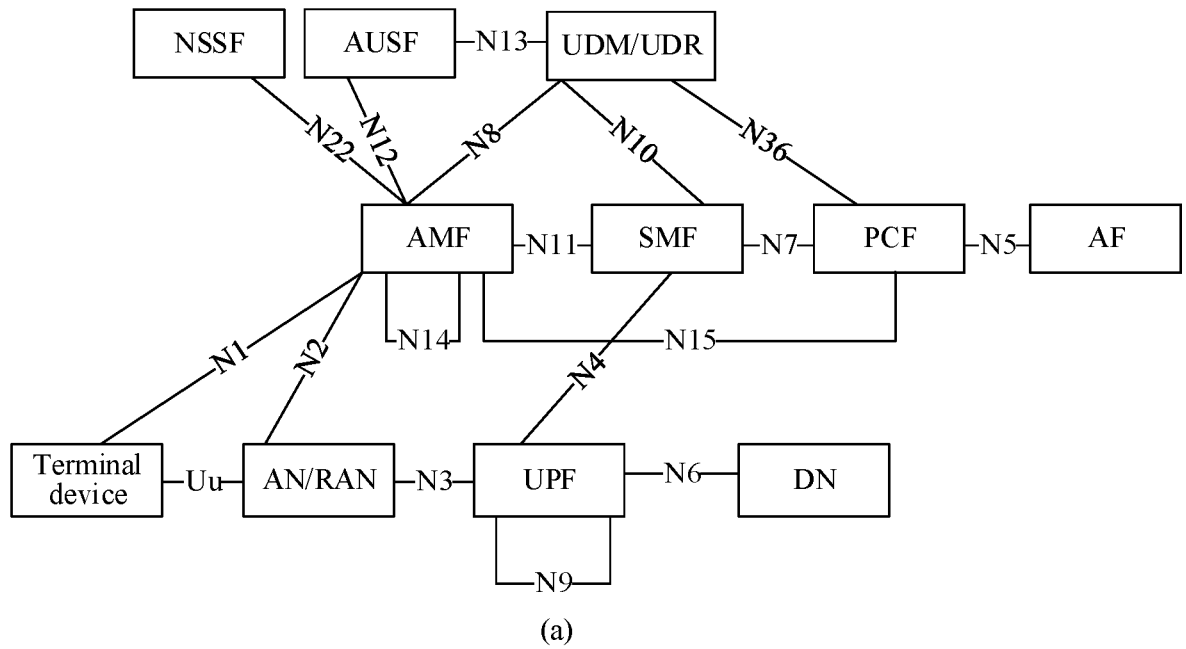
FIG. 1 is diagrams of two communication system architectures according to an embodiment of the present application.
Figure 1:
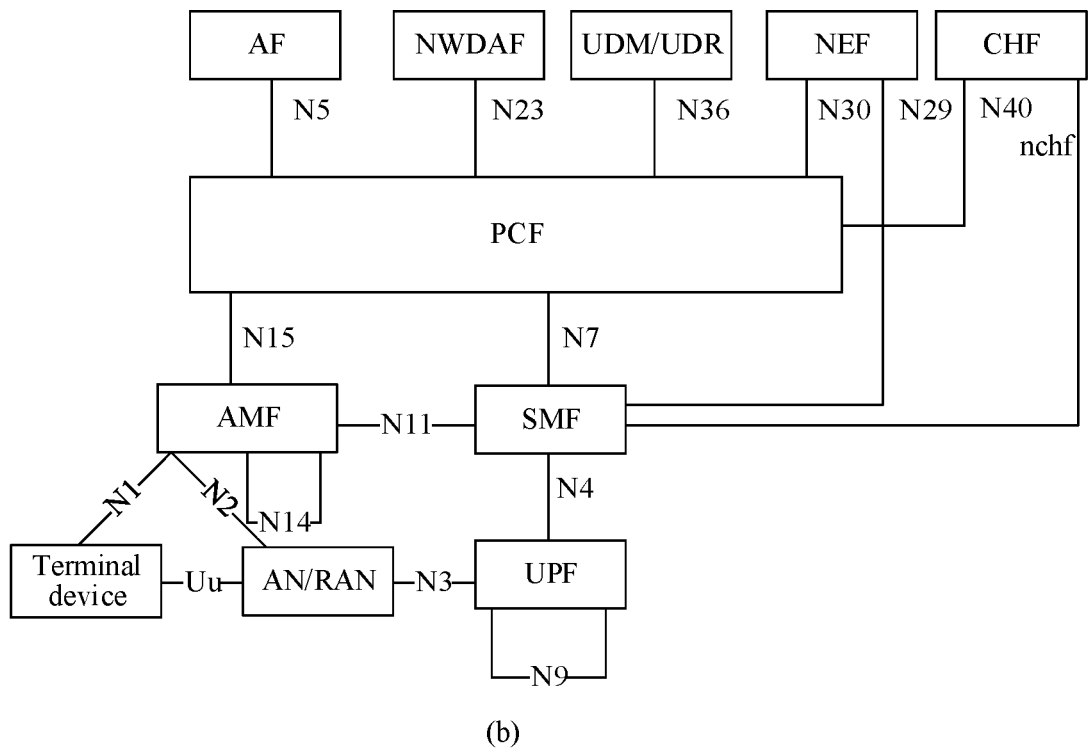

FIG. 1 is diagrams of two communication system architectures according to an embodiment of the present application. In (a) in FIG. 1 and (b) in FIG. 1, a network service architecture of a 5G system is used as an example to show an interaction relationship between network functions and entities and corresponding interfaces.

As shown in (a) in FIG. 1, network functions and entities included in a 3GPP service-based network architecture (service-based architecture, SBA) of a 5G system may include: a terminal device, an access network (access network, AN) or a radio access network (radio access network, RAN), a user plane function (user plane function, UPF) network element, a data network (data network, DN), an access management function (access management function, AMF) network element, a session management (session management, SMF) network element, an authentication server function (authentication server function, AUSF) network element, a policy control function (policy control function, PCF) network element, an application function (application function, AF) network element, a network slice selection function (network slice selection function, NSSF) network element, and a unified data management (unified data management, UDM)/unified data repository (unified data repository, UDR) network element.

As shown in (b) in FIG. 1, network functions and entities included in a 3GPP SBA of a 5G system may include: a terminal device, an AN/RAN, a UPF network element, an AMF network element, an SMF network element, a PCF network element, an AF network element, a UDM/UDR network element, a network data analytics function (network data analytics function, NWDAF) network element, a network exposure function (network exposure function, NEF), and a charging function (charging function, CHF) network element.

The terminal device, the AN/RAN, the UPF, and the DN are generally referred to as user plane network functions and entities (or user plane network elements), and the remaining parts are generally referred to as control plane network functions and entities (or control plane network elements). The processing functions of the control plane network elements in one network are defined in the 3GPP. The control plane network elements have functional behaviors defined in the 3GPP and interfaces defined in the 3GPP. A network function can be used as one network element running on dedicated hardware, or a software instance running on dedicated hardware, or a virtual function instantiated on an appropriate platform, for example, implemented on cloud infrastructure.

The main functions of the network elements are described below in detail.

AN/RAN: The AN/RAN may be a base station in any of various forms, for example, a macro base station, a micro base station (also referred to as a "small station"), a distributed unit-control unit (distributed unit-control unit, DU-CU) or the like. The DU-CU is a device that is deployed in a radio access network and can perform wireless communication with the terminal device. In addition, the base station may be a radio controller in a cloud radio access network (cloud radio access network, CRAN) scenario, a relay station, an access point, an in-vehicle device, a wearable device, a network device in a future evolved public land mobile network (public land mobile network, PLMN) network or the like. The AN/RAN may be a broadband network service gateway (broadband network gateway, BNG), a convergence switch, a non-3GPP access device or the like. The AN/RAN is mainly responsible for functions such as radio resource management of air interfaces, uplink and downlink data classification, QoS management, data compression and encryption, completion of signaling processing with a control plane network element or completion of data forwarding with a user plane function network element. The specific form and structure of the AN/RAN are not limited in the embodiments of the present application. For example, in systems using different radio access technologies, names of devices having base station functions may be different. For example, the base station may be an evolved universal terrestrial radio access network (evolved universal terrestrial radio access network, E-UTRAN) device such as an evolved NodeB (evolutional NodeB, eNB or e-NodeB) in LTE. The base station may be a transmission/reception point (transmission/reception point, TRP) or may be a wireless terminal (wireless terminal, WT) such as an access point (access point, AP) or an access controller (access controller, AC) or another network device with a capability of communicating with a terminal device and a core network, for example, a relay device, an in-vehicle device or a smart wearable device. Alternatively, the base station may be a next generation radio access network (next generation radio access network, NG-RAN) device (for example, a gNB) in a 5G system. The type of the AN/RAN is not limited in the present application.

The UPF network element is mainly responsible for packet routing and forwarding, QoS processing of user plane data, charging information statistics, and the like. A transmission resource and a scheduling function for providing a service to a terminal device in the UPF network element is managed and controlled by an SMF network element. Specifically, the functions of the UPF network element include: 1) an intra-system/inter-system mobility anchor; 2) a packet data network (packet data network, PDN) session node joined to an external data network; 3) data packet routing/forwarding, where user data may be received from the DU, the (R)AN transmits the user data to the terminal device, the UPF network element may receive user data from the terminal device through the (R)AN and forward the user data to the DN, and a transmission resource and a scheduling function for providing a service to the terminal device in the UPF network element are managed and controlled by an SMF network element; 4) a policy rule performs a user plane part and data packet detection; 5) a traffic usage report; 6) uplink classification supports the routing of a service flow to an external data network; 7) a bifurcation point supporting a multi-connection packet data unit (packet data unit, PDU session); 8) QoS processing of a user plane, for example, packet filtering, uplink and downlink rate limiting, and gating; 9) uplink service check; 10) data packet labeling in uplink and downlink transport layers; and 11) buffering of downlink data packets and triggering of a downlink data indication.

DN: ADN is a network used for transmitting data. For example, the DU may be an operator service network, internet access or a third-party service network. The DN may exchange information with the terminal device through a PDU session. The PDU session may be of one of various types, for example, an internet protocol version 4 (internet protocol version 4, IPv4) type or an IPv6 type.

The AMF network element is mainly responsible for processing of control plane messages, for example, access control, mobility management, lawful interception, and access authentication/authorization. Specifically, the functions of the AMF network element mainly include: 1) processing of an access network control plane; 2) processing of a NAS message to be responsible for NAS encryption and integrity protection; 3) registration management; 4) connection management; 5) access management; 6) mobility management; 7) legal information interception; 8) provision of a session management message between the terminal device and the SMF network element; 9) implementation of transparent transmission of a routed session management (session management, SM) message, similar to a transparent transmission proxy; 10) access authentication; 11) access authorization; 12) forwarding of an SMS message (SMS message) between the terminal device and a short message service functionality (short message service functionality, SMSF); 13) interaction with an AUSF network element and the terminal device, to obtain an intermediate key for the authentication of the terminal device; and 14) calculation of a specific key of an access network.

The SMF network element is mainly used for session management, IP address assignment and management of the terminal device, selection of a manageable user plane function, a termination point of a policy and charging control function interface, downlink data notification, and the like. Specifically, the main functions of the SMF network element include: 1) session management, session establishment, modification, and release, including maintenance of a channel between the UPF network element and the AN/RAN node; 2) IP address assignment and management of the terminal device; 3) selection and control of user plane functions; 4) configuration of a correct service route on the UPF network element; 5) the implementation and execution of a policy control function; 6) policy execution and a QoS control part; 7) lawful interception; 8) processing of a session management part in a NAS message; 9) downlink data indication; 10) initiation of specific session management information of an access network (through routing of the AMF network element); 11) determination of a mode of service continuity in a session; and 12) a roaming function.

The PCF network element is mainly used for providing parameters related to a policy rule, an access management (access management, AM) policy rule, and an SM policy rule to the terminal device, the AMF network element or the SMF network element separately, managing user subscription information, joining to the UDM network element to access subscriber information related to policy decision, and the like. The PCF network element generally decides a policy according to subscription information or the like.

The AUSF network element is mainly responsible for network security, used for generating a key, implementing mutual authentication of the terminal device, and supporting a unified authentication framework.

The AF network element is used for providing services, and is mainly used for: 1) application influence on service routing; 2) exposure of capabilities of an accessed network; and 3) interacting with a policy framework for policy management and control.

The NSSF network element is mainly used for selecting and managing a network slice instance (network slice instance, NSI), determining a mapping between allowed network slice information and used network slice information, and determining a mapping between configured network slice information and subscribed network slice information.

The NEF network element is an interface network element for two-way information exchange between internal and external entities of a network, and is also a logical unit for distributing and collecting internal information, mainly including three capabilities: a monitoring capability, a supply capability, and a policy/charging capability. The monitoring capability is mainly monitoring of a special event of the terminal device, and outputting monitoring information. For example, the NEF network element outputs the location information, connectivity, a roaming status, connection persistence, and the like of the terminal device. The supply capability refers to that an external entity may provide information through the NEF network element for use by the terminal device. Such information may include mobility management and session management information, for example, a periodic communication time, a communication duration, and a scheduling communication time. The policy/charging capability refers to that the external entity transfers a requirement through the NEF network element for QoS processing and a charging policy.

The UDM/UDR network element is mainly used for: 1) credit authentication processing; 2) user identifier processing; 3) access authorization; 4) registration/mobility management; 5) subscription management; and 6) SMS management.

The UDR network element and the UDM network element may be independent of each other. The UDR is used for providing storage and retrieval of a PCF policy, storage and retrieval of open structured data, storage of user information of an application function request, and the like. Alternatively, the UDR network element may be integrated in the UDM network element. This is not limited in the present application.

The NWDAF network element is mainly used for supporting gathering and analysis of network data, and providing an analysis result to other network elements. For example, in the embodiments of the present application, the NWDAF network element may obtain historical data of receiving and processing a communication resource request of the terminal device by other network elements, obtain statistical information and/or action indication information according to the historical data, and send the statistical information and/or the action indication information to the terminal device.

The CHF network element is mainly used for quota management, call detail record generation or the like.

The terminal device and the (R)AN communicate with each other by using an air interface technology (as shown in FIG. 1, communicate by using a Uu interface). N1 is an interface point between the terminal device and the AMF network element, N2 is an interface between the (R)AN and the AMF network element, N3 is an interface between the (R)AN and the UPF network element, N4 is an interface between the SMF network element and the UPF network element, and N6 is an interface between the UPF network element and the DN; N22 is an interface between the AMF network element and the NSSF network element, N12 is an interface between the AMF network element and the AUSF network element, N8 is an interface between the AMF network element and the UDM/UDR network element, N11 is an interface between the AMF network element and the SMF network element, N14 is an interface between the AMF network element and another AMF network element, N15 is an interface between the AMF network element and the PCF network element, N10 is an interface between the SMF network element and the UDM/UDR network element, N4 is an interface between the SMF network element and the UPF network element, N7 is an interface between the SMF network element and the PCF network element, N5 is an interface between the AF network element and the PCF network element, N9 is an interface between the UPF network element and another UPF network element, and N36 is an interface between the PCF network element and the UDM/UDR network element; and N23 is an interface between the NWDAF network element and the PCF network element, N30 is an interface between the NEF network element and the PCF network element, N40 is an interface between the CHF network element and the PCF network element, and nchf is an interface between the CHF network element and the SMF network element.

In the present application, a first network device and a second network device may be the same device or may be different devices.

For example, when the first network device and the second network device are the same device, the first network device (that is, the second network device) may be any network device. For example, the first network device may be the AN/RAN, the AMF network element, the SMF network element, the NEF network element, the UDM/UDR network element, the UPF network element, the NSSF network element, the AUSF network element or the like in the communication system architecture shown in FIG. 1. Alternatively, the first network device (that is, the second network device) may be any network device in another communication system architecture.

When the first network device and the second network device are different devices, the first network device may be a device configured to comprehensively analyze network data, for example, the NWDAF network element in the communication system architecture shown in FIG. 1, and the second network device may be the AN/RAN, the AMF network element, the SMF network element, the NEF network element, the UDM/UDR network element, the UPF network element, the NSSF network element, the AUSF network element or the like in the communication system architecture shown in FIG. 1. Alternatively, the second network device may be any network device in another communication system architecture.

Figure 2:
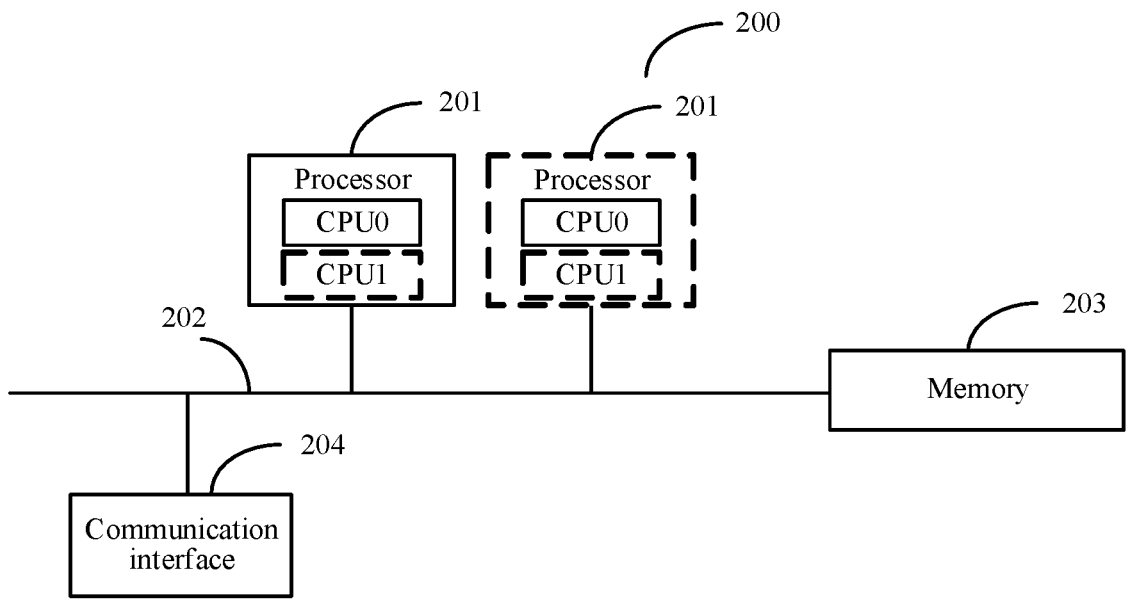
FIG. 2 is a schematic diagram of a hardware structure of a network device according to an embodiment of the present application.

FIG. 2 is a schematic diagram of a hardware structure of a network device. As shown in FIG. 2, the network device 200 may include a processor 201, a communication line 202, a memory 203, and at least one communication interface (only the communication interface 204 is used as an example for description in FIG. 2).

The processor 201 may be a general-purpose central processing unit (central processing unit, CPU), a microprocessor, an application-specific integrated circuit (application-specific integrated circuit, ASIC), or one or more integrated circuits configured to control execution of a program in the solutions of the present application.

The communication line 202 may include a channel, to transmit information between the foregoing components.

The communication interface 204 uses any apparatus of a transceiver type to communicate with another device or a communication network such as an Ethernet, a RAN or a WLAN.

The memory 203 may be a read-only memory (read-only memory, ROM), another type of static storage device that can store static information and instructions, a random access memory (random access memory, RAM), or another type of dynamic storage device that can store information and instructions, or may be an electrically erasable programmable read-only memory (electrically erasable programmable read-only memory, EEPROM) or a compact disc read-only memory (compact disc read-only memory, CD-ROM) or another compact disc storage, optical disc storage (including a compressed optical disc, a laser disc, an optical disc, a digital versatile optical disc, and a Blu-ray disc), a magnetic disk storage medium, or another magnetic storage device, or any another medium that can be used to carry or store desired program code in the form of an instruction or a data structure and that can be accessed by a computer, but not limited thereto. The memory may exist independently, and is connected to the processor by the communication line 202. The memory may be alternatively integrated with the processor.

The memory 203 is configured to store computer executable instructions for performing the solutions of the present application. The memory 203 may store instructions for implementing modular functions, which are controlled and executed by the processor 201. The processor 201 is configured to execute the computer executable instructions stored in the memory 203 to implement the method provided in the following embodiments of the present application. FIG. 2 is only a schematic diagram of the memory 203. The memory may further include other functional instructions. This is not limited in the present application.

Optionally, the computer executable instructions in the present application may also be referred to as application code. This is not specifically limited in the present application.

During specific implementation, in an embodiment, the processor 201 may include one or more CPUs, for example, a CPU 0 and a CPU 1 in FIG. 2.

It should be noted that FIG. 2 shows only an example of the network device, and the specific structure of the network device is not limited. For example, the network device may further include other functional modules. In addition, any network device including the first network device and the second network device in the present application, for example, the AN/RAN, the AMF network element, the SMF network element, the NEF network element, the UDM/UDR network element, the UPF network element, the NSSF network element, the AUSF network element, the NWDAF network element or the like shown in FIG. 1, may have a hardware structure the same as or similar to that shown in FIG. 2.

In the present application, the terminal device may be a desktop device, a laptop device, a handheld device, a wearable device, a smart home device, a computing device, an in-vehicle device or the like with a wireless connection function, for example, a netbook, a tablet computer, a smartwatch, a ultra-mobile personal computer (ultra-mobile personal computer, UMPC), a smart camera, a personal digital assistant (personal digital assistant, PDA), a portable multimedia player (portable multimedia player, PMP), an augmented reality (augmented reality, AR)/virtual reality (virtual reality, VR) device, a wireless device on an aircraft, a wireless device on a robot, a wireless device in industrial control, a wireless device in remote medical, a wireless terminal in a smart grid, a wireless terminal in a smart city, a wireless terminal in a smart home, or the like. Alternatively, the terminal device may be a wireless device in narrowband technologies.

In addition, the remote terminal device may be an access terminal, a subscriber unit, a subscriber station, a mobile station, a mobile console, a relay station, a remote station, a remote terminal, a mobile device, a user terminal (user terminal), a terminal (terminal), a wireless communication device, a user agent, or a user apparatus. The terminal device may be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, an in-vehicle device, a wearable device, a terminal device in a future 5G network, a terminal device in a future evolved PLMN, a terminal device in future vehicle-to-everything or the like. In addition, the terminal device may be a terminal device in an IoT system. The specific type and structure of the terminal device are not limited in the present application.

Figure 3:
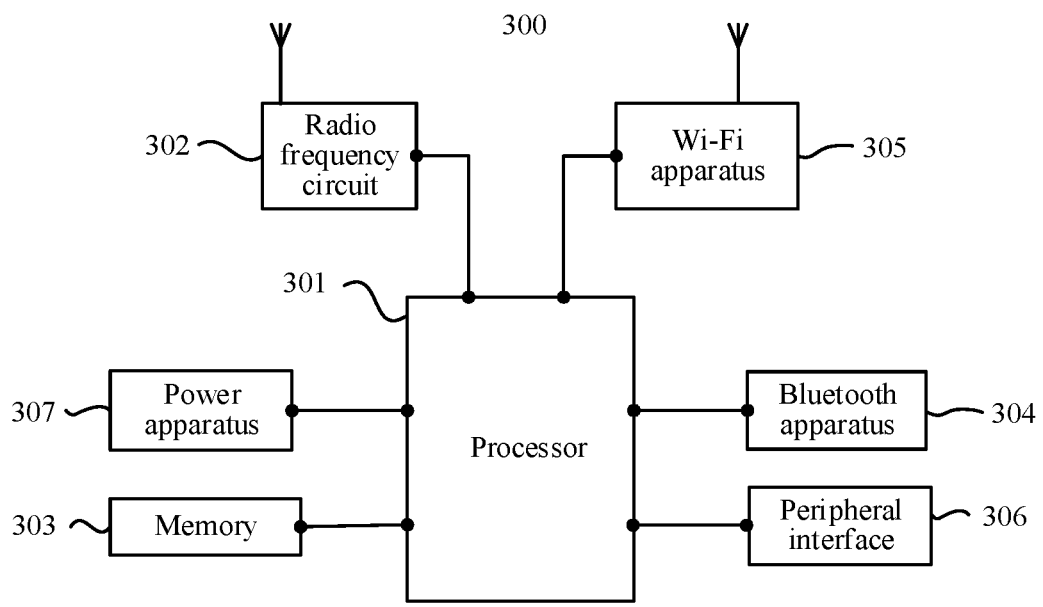
FIG. 3 is a schematic diagram of a hardware structure of a terminal device according to an embodiment of the present application.

FIG. 3 is a schematic diagram of a hardware structure of a terminal device. As shown in FIG. 3, the terminal device 300 may specifically include components such as a processor 301, a radio frequency circuit 302, a memory 303, a Bluetooth apparatus 304, a Wi-Fi apparatus 305, a peripheral interface 306, and a power apparatus 307. These components may communicate by using one or more communication buses or signal cables (not shown in FIG. 3). A person skilled in the art may understand that the hardware structure shown in FIG. 3 constitutes no limitation on the terminal device 300, and the terminal device 300 may include more or fewer components than those shown in the figure, or some components may be combined, or a different component deployment may be used.

The following makes specific introduction of the components of the terminal device 300 with reference to FIG. 3.

The processor 301 may be a control center of the terminal device 300, which is connected to various other parts of the terminal device 300 by various interfaces and lines, and runs or executes computer programs, for example, an application client program (which may be referred to as an App for short), stored in the memory 303, to perform various functions of the terminal device 300.

In some embodiments, the processor 301 may be a general-purpose CPU, a microprocessor, a specific ASIC, or one or more integrated circuits configured to control execution of a program in the solutions of the present application. The processor 301 may include one or more CPUs.

The radio frequency circuit 302 may be configured to send and receive a radio signal. Specifically, the radio frequency circuit 302 may receive downlink data from a base station and send the downlink data to the processor 301 for processing. In addition, the radio frequency circuit 302 may further send uplink data to the base station.

Generally, the radio frequency circuit 302 includes, but is not limited to, an antenna, at least one amplifier, a transceiver, a coupler, a low noise amplifier, a duplexer, and the like. In addition, the radio frequency circuit 302 may also communicate with another device through wireless communication. Any communication standard or protocol may be used for the wireless communication, and includes, but is not limited to, a Global System for Mobile Communications, a general packet radio service, Code Division Multiple Access, Wideband Code Division Multiple Access, Long Term Evolution, an email, an SMS message service, and the like.

The memory 303 is configured to store a computer program, and may be further configured to store data. The memory 303 may be a ROM or a RAM; or may be an EEPROM, a CD-ROM or another compact-disc storage medium, optical disc storage medium (including a compact disc, a laser disk, an optical disc, a digital versatile disc, a Blu-ray disc, or the like) and magnetic disk storage medium, another magnetic storage device, or any other medium that can be configured to carry or store program code and is accessible by a computer, but is not limited thereto.

The processor 301 may run the computer program stored in the memory 303 to perform various functions and data processing of the terminal device 300.

The memory 303 may include a program storage area and a data storage area. The program storage area may store an operating system and an application program required by at least one function. The data storage area may store data created according to the use of the terminal device 300.

The memory 303 may store a computer program for implementing modular functions, which is controlled and executed by the processor 301. The processor 301 is configured to execute the computer program stored in the memory 303 to implement the method provided in the following embodiments of the present application.

In addition, the memory 303 may include a high-speed random access memory, or may include a non-volatile memory, for example, a magnetic disk storage device, a flash memory device, or another volatile solid-state storage device. The memory 303 may store various operating systems, for example, an iOS operating system and an Android operating system.

Although not shown in FIG. 3, the terminal device 300 may further include a touchscreen, a positioning apparatus, an audio circuit, a fingerprint capture device, a speaker, a microphone, one or more sensors (for example, an optical sensor or a motion sensor), a camera (including a front-facing camera and/or a rear-facing camera), a flash, a miniature projection device, a near-field communication (near-field communication, NFC) apparatus, and the like. Details are not described herein again.

It should be understood that the hardware modules included in the terminal device 300 shown in FIG. 3 are only exemplarily described, and do not constitute a limitation on the present application. In fact, the terminal device 300 provided in the embodiments of the present application may further include other hardware modules having an interaction relationship with the hardware modules shown in the figure, and the other hardware modules are not specifically limited herein. In the present application, the terminal device may learn of a specific state of the network device (for example, the second network device), for example, whether the second network device has a failure; and one or more of whether the failure is a software failure or a hardware failure, a node position of the failure, and severity of the failure if the second network device has the failure. With the knowledge of the specific state of the second network device, appropriate measures may be taken to request a communication resource from the second network device, thereby increasing the probability of successfully obtaining a communication resource.

The node position of the failure may be a control plane node, for example, a non access stratum (non access stratum, NAS), an access stratum (access stratum, AS) or a transport layer of the session initiation protocol (session initiation protocol, SIP). The node position of the failure may be a data plane node, for example, an air interface (for example, a Uu interface shown in FIG. 1) or a base station.

It may be understood that there are many protocol layers, and a request may be rejected, a request may fail, and another problem may occur in every layer that involves interaction with a network. Therefore, a method for acquiring a network resource provided in the embodiments of the present application is applicable to a process of requesting a network resource in any layer that involves interaction with a network.

Figure 4:
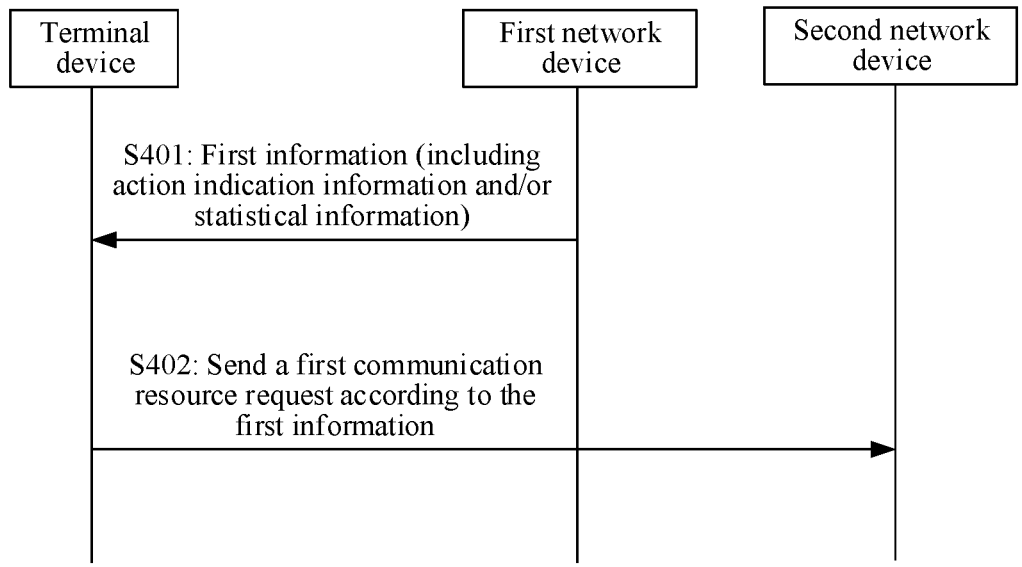
FIG. 4 is a flowchart of a method for acquiring a network resource according to an embodiment of the present application.

A method for acquiring a network resource provided in the embodiments of the present application is described below in detail with reference to the accompanying drawings and by using an example in which a terminal device requests a communication resource from a second network device. The second network device may include an access network device (for example, the AN/RAN) or a core network device (for example, the AMF network element, the SMF network element, the NEF network element, the UDM/UDR network element, the UPF network element, the NSSF network element or the AUSF network element). FIG. 4 is a flowchart of a method for acquiring a network resource according to an embodiment of the present application.

As shown in FIG. 4, the method for acquiring a network resource provided in the embodiments of the present application may include: performing, by a first network device, the following step S401 when a second network device receives a first request from a terminal device, and performing, by the terminal device, the following step S402 after the first network device has performed step S401.

The first request includes various requests in a signaling plane and a user plane, for example, various requests in scenarios such as a registration (attach) request, a PDN/PDU activation request, a voice over LTE (voice over LTE, VoLTE) registration request, a calling request and a called request of VoLTE, voice over Wi-Fi, (voice over Wi-Fi, VoWIFI) registration request, a calling request and a called request of VoWIFI, an RRC setup request, and a Server Request request. A specific scenario is not limited in the present application.

S401: The first network device sends first information to the terminal device. The first information includes action indication information and/or statistical information.

Correspondingly, the terminal device receives the first information from the first network device.

Specifically, after the second network device receives the first request from the terminal device, in a case that a preset condition is satisfied, the first network device sends the first information to the terminal device. For example, the preset condition may include that the second network device rejects the first request of the terminal device.

For example, a cause why the second network device rejects the first request of the terminal device may include, but not limited to, a cause that a network element in a network has an insufficient resource (for example, insufficient bandwidth, an excessively large number of users or a temporary failure), communication fails between network elements, or the second network device does not support a function and cannot provide a service. The cause why the second network device rejects the first request of the terminal device is not limited in the present application.

As described above, in a conventional technology, when a request (for example, the first request) from the terminal device is rejected, the terminal device usually takes a next step in the solution measures based on the cause of a failure returned by a network device to attempt to reacquire a network resource. However, the cause of a failure returned by the network device is usually rather general. As a result, the terminal device cannot understand the cause of a failure in a specific and detailed way, and cannot take appropriate solution measures to solve the problem that resources fail to be acquired. Therefore, in the present application, when the first request is rejected, the first information sent by the first network device to the terminal may include action indication information and/or statistical information, so that the terminal device may take appropriate measures according to the specific state of the network device (the second network device) to request a communication resource from the second network device, thereby increasing the probability of successfully obtaining a communication resource.

For example, in a conventional RRC message, the message returned by the network device may be:

```
DL-CCCH-MessageType ::= CHOICE {
    C1 CHOICE {
        rrcReject RRCReject,
        rrcSetup RRCSetup,
        spare2 NULL,
        spare1 NULL
    },
    MessageClassExtension SEQUENCE { }
}.
```

In the present application, a field may be newly added to carry the action indication information and the statistical information. For example, in the RRC message, the first information may be carried in the following message:

```
DL-CCCH-MessageType ::= SEQUENCE {
    C1 CHOICE {
        rrcReject RRCReject,
        rrcSetup RRCSetup,
        spare2 NULL,
        spare1 NULL
    },
    MessageClassExtension SEQUENCE {
        rrcCureAction RRCCureAction, //newly added field (action indication information)
        rrcFailOtherInfo RRCFailInfo //newly added field (statistical information)
    }
}.
```

In another example, in a conventional MIB message, the message returned by the network device may be:

```
MIB ::= SEQUENCE {
    systemFrameNumber BIT STRING (SIZE (6)),
    subCarrierSpacingCommon ENUMERATED {scs15or60, scs30or120},
    ssb-SubcarrierOffset INTEGER (0..15),
    dmrs-TypeA-Position ENUMERATED {pos2, pos3},
    pdcch-ConfigSIB1 PDCCH-ConfigSIB1,
    cellBarred ENUMERATED {barred, notBarred},
    intraFreqReselection ENUMERATED {allowed, notAllowed},
    spare BIT STRING (SIZE (1))
}.
```

In the present application, in the MIB message, the first information may be carried in the following message:

```
MIB ::= SEQUENCE {
    systemFrameNumber BIT STRING (SIZE (6)),
    subCarrierSpacingCommon ENUMERATED {scs15or60, scs30or120},
    ssb-SubcarrierOffset INTEGER (0..15),
    dmrs-TypeA-Position ENUMERATED {pos2, pos3},
    pdcch-ConfigSIB1 PDCCH-ConfigSIB1,
    cellBarred ENUMERATED {barred, notBarred},
    intraFreqReselection ENUMERATED {allowed, notAllowed},
    spare BIT STRING (SIZE (1)),
    cellCureAction INTEGER (0..15), //newly added field (action indication information)
    cellFailOtherInfo INTEGER //newly added field (statistical information)
}.
```

In another example, in a conventional Attach scenario, the message returned by the network device may be:

```
MSG ::= CHOICE {
    emmCause CHOICE {
        EmmCause //cause value shown in FIG. 8
    }
}.
```

In the present application, in the Attach scenario, the first information may be carried in the following message:

```
MSG ::= SEQUENCE {
    emmCause CHOICE {
        cause value shown in FIG. 8
    }
    emmFailInfo SEQUENCE{ //newly added field
        emmCureAction INTEGER (0..15), //newly added field (action indication information)
        emmFailOtherInfo INTEGER //newly added field (statistical information)
    }
}.
```

In another example, in a conventional packet data protocol (packet data protocol, PDP) activation scenario, the message returned by the network device may be:

```
MSG ::= CHOICE {
    esmCause CHOICE {
        EsmCause //cause value shown in FIG. 8
    }
}.
```

In the present application, in the PDP activation scenario, the first information may be carried in the following message:

```
MSG ::= SEQUENCE {
    esmCause CHOICE {
        cause value shown in FIG. 8
    }
    esmFailInfo SEQUENCE{ //newly added field
        esmCureAction INTEGER (0..15), //newly added field (action indication information)
        esmFailOtherInfo INTEGER //newly added field (statistical information)
    }
}.
```

It should be noted that the formats of the messages carrying the first information in the foregoing different scenarios are only used as examples, and the formats of the messages carrying the first information in the embodiments of the present application include, but not limited to, the foregoing examples, as long as an abstract syntax notation one (abstract syntax notation one, ASN.1) format is satisfied. In addition, a specific position of a newly added field is also not limited in the present application.

The action indication information is used for requesting a communication resource from the second network device after the terminal device lowers a resource request level or is used for acquiring a communication resource by the terminal device through retries when a communication resource request fails. The action indication information is specifically used for indicating a first action. The first action may include, but not limited to, acquiring a communication resource through retries, or sending a first communication resource request to the second network device after one or more of the following operations are performed: lowering a capability of the terminal device, turning off one or more functions of the terminal device, changing a cell, changing an access technology or changing a parameter of the communication resource request.

Optionally, in some examples, the first action includes acquiring a communication resource through retries, and the first action further includes a time interval between retries.

In the embodiments of the present application, the statistical information is at least used for representing one or more of the following: a status of receiving and processing a communication resource request by the second network device within a preset time period, and a status of a network failure of the second network device within the preset time period. For example, the preset time period may be a preset time period. Alternatively, the preset time period may be a preset time period (for example, one hour, one day or one week) before the moment at which the second network device sends the first information to the terminal device. A related setting policy of the preset time period is not limited in the present application.

In some embodiments, the statistical information may be obtained by the second network device according to historical data of receiving and processing a communication resource request by the second network device within the preset time period.

In the embodiments of the present application, the action indication information is determined by the first network device according to the status of processing a communication resource request by the second network device within the preset time period. Specifically, the first network device may determine, according to the status of processing a communication resource request by the second network device within the preset time period, whether the second network device has a failure; and one or more of whether the failure is a software failure or a hardware failure, anode position of the failure, and severity of the failure if the second network device has the failure. With the knowledge of the status of the second network device, the first network device may determine the first action, so that the terminal device may successfully acquire a first communication resource from the second network device by performing the first action.

In some embodiments, the first network device and the second network device are the same device. In this case, reference may be made to the flowchart shown in FIG. 4. For example, the first network device (that is, the second network device) is the AMF network element shown in (a) in FIG. 1.

Figure 5:
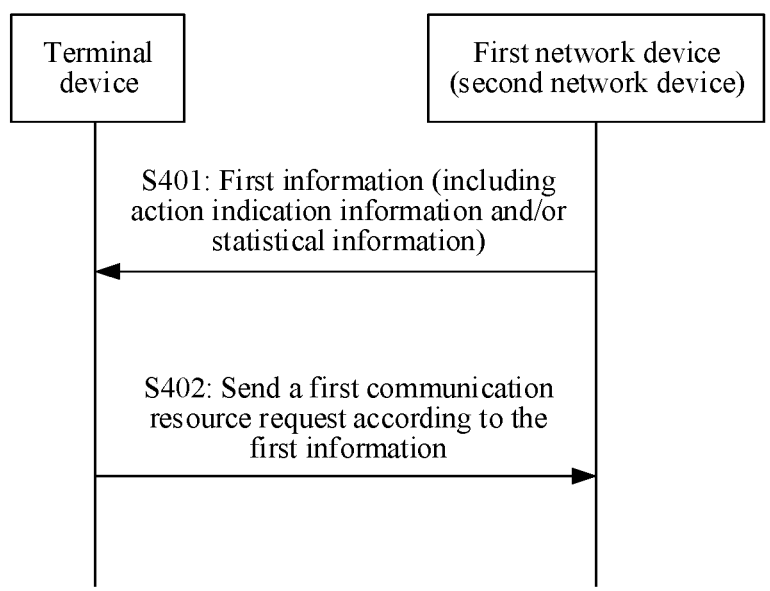
FIG. 5 is a flowchart of a method for requesting again to acquire a network resource after rejection according to an embodiment of the present application.

In some other embodiments, the first network device and the second network device are different devices. In this case, the flowchart shown in FIG. 4 may be specifically represented as the flowchart shown in FIG. 5. For example, the first network device is the NWDAF network element shown in (b) in FIG. 1, and the second network device is the AMF network element shown in (b) in FIG. 1.

Figure 6:
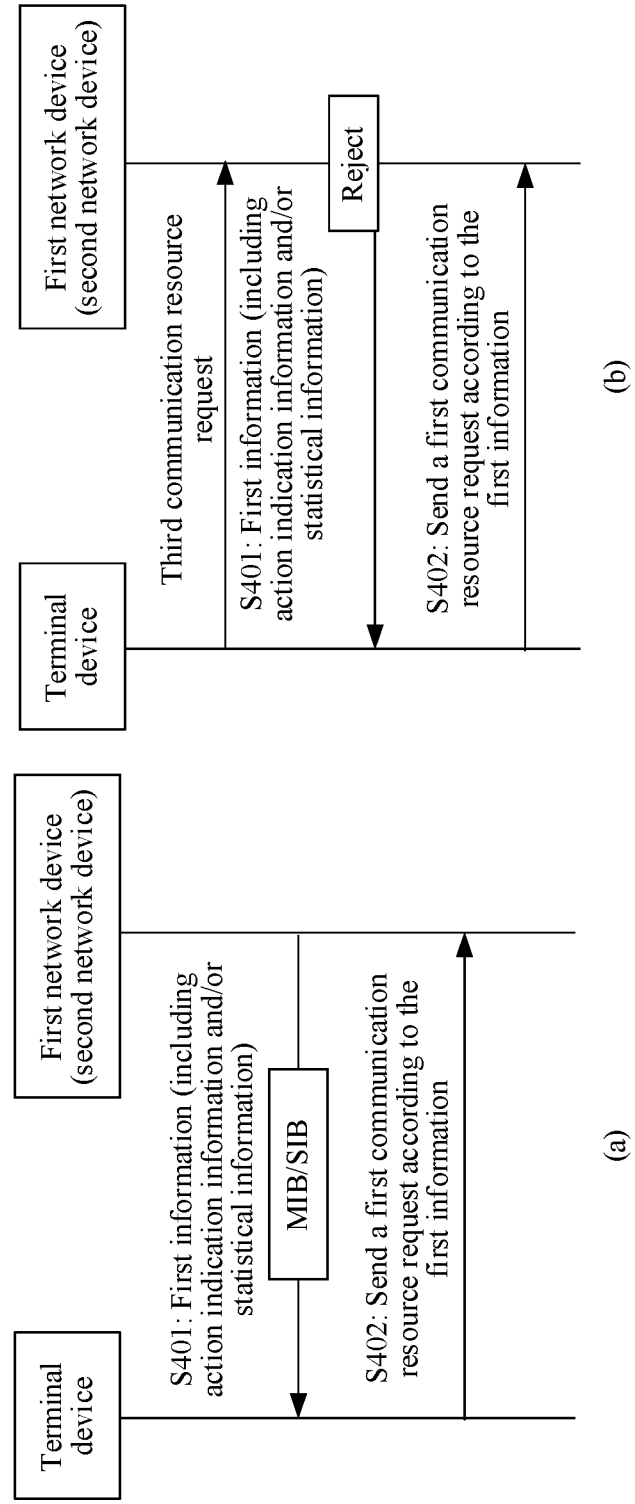
FIG. 6 is a flowchart of a method for acquiring a network resource according to first information in a system message according to an embodiment of the present application.

FIG. 6 is a flowchart of a method for acquiring a network resource in two scenarios by using an example in which the first network device and the second network device are the same device. (a) in FIG. 6 is a flowchart of a method for acquiring a network resource based on a system message. (b) in FIG. 6 is a flowchart of a method for reacquiring a network resource after a resource request is rejected.

As shown in (a) in FIG. 6, the second network device (that is, the first network device) sends the first information to the terminal device through the system message. For example, the system message may include a MIB message or a SIB message. For the scenario shown in (a) in FIG. 6, the preset time period may be a preset time period (for example, one hour, one day or one week) before the moment at which the second network device sends the system message to the terminal device. As shown in (b) in FIG. 6, the terminal device first sends a third communication resource request (that is, the first request above) to the second network device (that is, the first network device), and while rejecting the third communication resource request, the second network device (that is, the first network device) sends the first information to the terminal device. The third communication resource request is used for acquiring a third communication resource, and the third communication resource and the first communication resource are used for providing the same communication service. For the scenario shown in (b) in FIG. 6, the preset time period may be a preset time period (for example, one hour, one day or one week) before the moment at which the second network device rejects the third communication resource request of the terminal device.

In the embodiments of the present application, that the second network device (that is, the first network device) rejects the third communication resource request may be a decision made based on availability of a communication resource, a capability of the second network device (that is, the first network device), a capability of the terminal device, compatibility, a permission, network congestion, a resource preemption policy, a priority, signal strength/signal quality, a count of users, and the like. For example, the capability of the second network device (that is, the first network device) may include, but not limited to, communication system types such as 4G and 5G supported by the second network device (that is, the first network device). The capability of the terminal device may include, but not limited to, communication system types such as 4G, 5G, and Wi-Fi supported by the terminal device. The compatibility may include, but not limited to, compatibility between communication protocols supported by the second network device (that is, the first network device) and the terminal device. The permission may include, but not limited to, a service permission of the terminal device, for example, a permission of accepting relay transmission, a permission of accessing the second network device (that is, the first network device). The priority may include, but not limited to, a priority of the terminal device and a priority of initiating a service by the terminal device. The count of users may include, but not limited to, a count of users that occupy communication resources of the same type as the first communication resource and a count of users that keep a communication connection with the second network device (that is, the first network device). A specific cause why the third communication resource request is rejected is not limited in the present application.

It should be noted that in the present application, in a case that the first information is sent by the NWDAF network element to the terminal device, the first information is obtained by the NWDAF network element according to historical data of receiving and processing a communication resource request by the second network device within the preset time period. Alternatively, further, the first information may be obtained by the NWDAF network element according to historical data of receiving and processing a communication resource request by the second network device and other network elements within the preset time period.

Specifically, after completing the processing of each communication resource request, the second network device and other network elements may send related information of the communication resource request to the NWDAF network element. In a case that the second network device rejects the communication resource request, the NWDAF network element summarizes historical data of receiving and processing a communication resource request by the second network device and other networks within the preset time period to obtain the first information, and further, sends the first information to the terminal device.

S402: The terminal device sends a first communication resource request to the second network device according to the first information.

Correspondingly, the second network device receives the first communication resource request from the terminal device.

The first communication resource request is used for acquiring the first communication resource. In a case that the first information includes the action indication information, the foregoing step S402 may include: sending, by the terminal device, the first communication resource request to the terminal device according to the first action indicated by the action indication information. In a case that the first information includes the statistical information and does not include the action indication information, the foregoing step S402 may include: determining, by the terminal device according to the statistical information, the first action, and performing the first action.

In the present application, the statistical information may be obtained by the second network device according to historical data of receiving and processing a communication resource request by the second network device within the preset time period. For example, the statistical information may include at least one piece of information 1 to information 11 within the preset time period:

Information 1: a count T_UE_CNT of terminal devices that send a communication resource request to the second network device.

For example, T_UE_CNT may be a total count of terminal devices that send a communication resource request to the second network device within a preset time period T. Alternatively, T_UE_CNT may be a total count of terminal devices that send a communication resource request to the second network device within the preset time period T after deduplication. This is not limited in the present application.

Information 2: a count T_REJ_UE_CNT of terminal devices whose communication resource request is rejected by the second network device.

For example, T_REJ_UE_CNT may be a total count of terminal devices that send a communication resource request to the second network device and is rejected by the second network device within the preset time period T. Alternatively, T_REJ_UE_CNT may be a total count of terminal devices that send a communication resource request to the second network device and rejected by the second network device within the preset time period T after deduplication. This is not limited in the present application.

Information 3: a ratio T_REJ_UE_RATIO of terminal devices whose communication resource request is rejected by the second network device.

$$T\_REJ\_UE\_RATIO = T\_REJ\_UE\_CNT / T\_UE\_CNT.$$

Information 4: a count T_REQ_CNT of communication resource requests received by the second network device.

Information 5: a count T_REJ_CNT of communication resource requests rejected by the second network device.

Information 6: a ratio of communication resource requests rejected by the second network device, and is also referred to as "a rejection ratio" T_REJ_RATIO.

$$T\_REJ\_RATIO=T\_REJ\_CNT/T\_REQ\_CNT.$$

Information 7: an average request time distance T_REQ_DISTANCE of receiving a communication resource request by the second network device.

It is assumed that a current moment at which the second network device acquires the statistical information is $T_{now}$, a moment of an $n^{th}$ communication resource request is $T_n$, n is a positive integer, and n∈[1, T_REQ_CNT]. T_REQ_DISTANCE may be calculated according to the following calculation formula:

$$T\_REQ\_DISTANCE_n = \Sigma_{n=1}^{T\_REQ\_CNT}(T_{now}-T_n)/T\_REQ\_CNT.$$

Information 8: an average rejection time distance T_REJ_DISTANCE of rejecting a communication resource request by the second network device.

It is assumed that the current moment at which the second network device acquires the statistical information is $T_{now}$; a moment at which the second network device rejects an $m^{th}$ communication resource request is $T_m$, m is a positive integer, and m∈[1, T_REJ_CNT]. T_REJ_DISTANCE may be calculated according to the following calculation formula:

$$T\_REJ\_DISTANCE = \Sigma_{m=1}^{T\_REJ\_CNT}(T_{now}-T_m)/T\_REJ\_CNT.$$

Information 9: an average request time interval T_REQ_INTERVAL of communication resource requests received by the second network device.

It is assumed that the current moment at which the second network device acquires the statistical information is $T_{now}$, the moment of the $n^{th}$ communication resource request is $T_n$, a moment of an $(n+1)^{th}$ communication resource request is $T_{(n+1)}$, n is a positive integer, and n∈[0, T_REQ_CNT]. T_REQ_INTERVAL may be calculated according to the following calculation formula:

$$T\_REQ\_INTERVAL = \Sigma_{n=1}^{T\_REQ\_CNT}(T_{n+1}-T_n)/(T\_REQ\_CNT-1).$$

Information 10: an average rejection time interval T_REJ_INTERVAL of rejecting communication resource requests by the second network device.

It is assumed that the current moment at which the second network device acquires the statistical information is $T_{now}$; a moment at which the second network device rejects an $m^{th}$ communication resource request is $T_m$, a moment at which the second network device rejects an $(m+1)^{th}$ communication resource request is $T_{(m+1)}$, m is a positive integer, and m∈[1, T_REJ_CNT]. T_REJ_INTERVAL may be calculated according to the following calculation formula:

$$T\_REJ\_INTERVAL = \Sigma_{m=1}^{T\_REJ\_CNT}(T_{m+1}-T_m)/T\_REJ\_CNT.$$

Information 11: a severity assessment value F of the network failure of the second network device within the preset time period.

For example, F may be calculated by the second network device according to the following calculation formula:

$$F = \left(\prod_{i=2}^{M} F_i\right) * Thre(T\_REJ\_UE\_CNT - C_3) * Thre(T\_REJ\_CNT - C_4).$$

-continued $$F_i = \left(C^{R_i - \frac{1}{2}}\right)^{C_5} * \left(C_1^{\frac{1}{I^i}}\right)^{C_6} * \left(C_2^{\frac{1}{T_{now}-T_i}}\right)^{C_7}.$$

$R_i$ is a result of processing an $i^{th}$ received communication resource request by the second network device within the preset time period T; in a case that $R_i=0$, it represents that the second network device accepts the $i^{th}$ communication resource request; and in a case that $R_i=1$, it represents that the second network device rejects the $i^{th}$ communication resource request. $I_i$ is a time interval between the $i^{th}$ communication resource request and an $(i-1)^{th}$ communication resource request. $T_{now}$ is a current moment, that is, the current moment at which the second network device acquires the statistical information. $T_i$ is a moment at which the second network device receives the $i^{th}$ communication resource request. $C_3$ is a preset count threshold of terminal devices whose communication resource request is rejected for determining a network failure. $C_4$ is a threshold of a count of times that a communication resource request is rejected for determining a network failure. C, $C_1$ and $C_2$ are constants greater than 1, $C_5$, and $C_6$ and $C_7$ are constants greater than 0.

It may be understood that in the foregoing calculation formula of calculating F, C is a constant greater than 1. Therefore, when $R_i=1$, that is, when the second network device rejects the $i^{th}$ communication resource request, $C^{R_i-1/2}$ is greater than 1; and when $R_i=0$, that is, when the second network device accepts the $i^{th}$ communication resource request, $$C^{R_i-\frac{1}{2}}$$

is less than 1.

$C_1$ is a constant greater than 1. Therefore, when $I_i$ is larger, $$C_1^{\frac{1}{I^i}}$$

is smaller; and when $I_i$ is smaller, $$C_1^{\frac{1}{I^i}}$$

is larger. $C_2$ is a constant greater than 1. Therefore, when a moment is closer to the current moment that is, $T_{now}-T_i$ is smaller, $$C_2^{\frac{1}{T_{now}-T_i}}$$

is larger; and when a moment is farther from the current moment $T_{now}$, that is, $T_{now}-T_i$ is larger, $$C_2^{\frac{1}{T_{now}-T_i}}$$

is smaller.

$C_3$ is a constant greater than 0. Therefore, the function Thre(x) is 1 when x>0 and is 0 when x≤0. When the count of terminal devices whose communication resource request is rejected by the second network device is greater than the preset count threshold $C_3$ of terminal devices whose communication resource request is rejected for determining a network failure, that is, when T_REJ_UE_CNT is greater than $C_3$, Thre(T_REJ_UE_CNT−$C_3$) is 1. When the count of terminal devices whose communication resource request is rejected by the second network device is less than or equal to the preset count threshold $C_3$ of terminal devices whose communication resource request is rejected for determining a network failure, that is, when T_REJ_UE_CNT is less than $C_3$, Thre(T_REJ_UE_CNT−$C_3$) is 0.

$C_4$ is a constant greater than 0. Therefore, the function Thre(x) is 1 when x>0 and is 0 when x≤0. When the count of communication resource requests rejected by the second network device is greater than the preset threshold of a count $C_4$ of times that a communication resource request is rejected for determining a network failure, that is, when T_REJ_CNT is greater than $C_4$, Thre(T_REJ_CNT−$C_4$) is 1. When the count of communication resource requests rejected by the second network device is less than or equal to the preset threshold of a count $C_4$ of times that a communication resource request is rejected for determining a network failure, that is, when T_REJ_CNT is less than $C_4$, Thre(T_REJ_CNT−$C_4$) is 0.

In the calculation formula $$F_i = \left(C^{R_i - \frac{1}{2}}\right)^{C_5} * \left(C_1^{\frac{1}{T^i}}\right)^{C_6} * \left(C_2^{\frac{1}{T_{now} - T_i}}\right)^{C_7}, C_5, C_1^{\frac{1}{T^i}}, C_6, C_2^{\frac{1}{T_{now} - T_i}},$$

and $C_7$ are all used for setting corresponding weights for $$C^{R_i - \frac{1}{2}}.$$

In the me calculation formula F=($\Pi_{i=2}^M F_i$)*Thre(T_REJ_UE_CNT−$C_3$)*Thre(T_REJ_CNT−$C_4$), Thre(T_REJ_UE_CNT−$C_3$) and Thre(T_REJ_CNT−$C_4$) are both used for setting a threshold for determining a network failure. Specifically, in a case that the count of terminal devices whose communication resource request is rejected by the second network device is greater than the preset count threshold $C_3$ of terminal devices whose communication resource request is rejected for determining a network failure, and the count of communication resource requests rejected by the second network device is greater than the preset threshold of a count $C_4$ of times that a communication resource request is rejected for determining a network failure, that is, T_REJ_UE_CNT is greater than $C_3$ and T_REJ_CNT is greater than $C_4$, a network failure problem is considered. In a case that T_REJ_UE_CNT is less than or equal to $C_3$ and/or T_REJ_CNT is less than or equal to $C_4$, a network failure problem is not considered. When the value of F is larger, there is more likely a network failure, or in other words, a network failure is severer.

In summary, as can be known from the calculation formula of calculating F, under equivalent conditions, within the preset time period T, as a count of times that a communication resource request succeeds increases, F decreases; and as the count of times that a communication resource request succeeds decreases, F increases. Under equivalent conditions, within the preset time period T, when a time interval between a moment at which a communication resource request is rejected and the current moment is shorter, F is larger; and when the time interval between the moment at which a communication resource request is rejected and the current moment is larger, F is smaller. In a case that the count of terminal devices whose communication resource request is rejected by the second network device is less than or equal to a preset count or a count of times that the second network device rejects a communication resource request is less than or equal to a preset count, F is 0, and a network failure is not considered.

It should be noted that the calculation formula of calculating F is only used as an example. A specific calculation method of the severity assessment value F of the network failure is not limited in the present application. For example, F may be obtained by using the following calculation formula:

$$F = (\Pi_{i=2}^M F_i) * \text{Thre}(T\_REJ\_UE\_CNT − C_3).$$

That is, in a case that T_REJ_UE_CNT is greater than $C_3$, a network failure problem is considered. In a case that T_REJ_UE_CNT is less than or equal to $C_3$, a network failure problem is not considered.

Alternatively, F may be obtained by using the following calculation formula:

$$F = (\Pi_{i=2}^M F_i) * \text{Thre}(T\_REJ\_CNT − C_4),$$

That is, in a case that T_REJ_CNT is greater than $C_4$, a network failure problem is considered. In a case that T_REJ_CNT is less than or equal to $C_4$, a network failure problem is not considered.

Further, in a case that the first action indicated by the action indication information in the first information sent by the second network device to the terminal device in the foregoing Step S401 is to acquire a communication resource through retries, the statistical information may further include information 12:

Information 12: a success ratio SUC_RATIO of obtaining a communication resource by the terminal device by using the first action.

More specifically, the information 12 is a success ratio of acquiring a communication resource by the terminal device through retries.

The success ratio of acquiring a communication resource by the terminal device through retries may be obtained according to any following calculation formula:

SUC_RATIO=$K1$*T_REJ_UE_RATIO+ $K2$*T_REJ_RATIO; and

SUC_RATIO=$K1$*(REJ_UE_RATIO+ $K2$*T_REJ_RATIO)+$K2$*(T_REQ_DISTANCE+ T_REJ_DISTANCE). $K1$ and $K2$ are constants greater than 0.

It should be noted that the calculation formula is only used as an example of calculating the success ratio of acquiring a communication resource by the terminal device through retries, and the success ratio of acquiring a communication resource by the terminal device through retries may be calculated by using another calculation formula. This is not limited in the present application.

Further, in the embodiments of the present application, the action indication information may be obtained by the second network device according to historical data of processing a communication resource request by the second network device within the preset time period.

For example, in a case that the second network device repeatedly rejects a communication resource request of the terminal device due to a mismatch of access technologies, the first action indicated by the action indication information sent by the second network device to the terminal device is changing an access technology. In another example, in a case that the second network device repeatedly rejects a communication resource request of the terminal device due to insufficient communication resources, the first action indicated by the action indication information sent by the second network device to the terminal device is one or more of lowering a capability of the terminal device, turning off one or more functions of the terminal device, or changing a parameter of the communication resource request.

Further, in some embodiments, in a case that the first information is sent by the second network device to the terminal device through the system message, the first information may further include a list of cells accessible by the terminal device. The list of cells includes identifier information of one or more cells. The one or more cells are cells administered by the second network device. The one or more cells are suitable cells for the terminal device, that is, cells that can provide a communication service to the terminal device. For example, the first network device and the second network device are the same device, and the first information includes the action indication information, the statistical information, and the list of cells accessible by the terminal device. As shown in (a) in FIG. 7, the foregoing Step S401 may be replaced with S401'-a:

S401'-a: The first network device sends first information to the terminal device. The first information includes the action indication information, the statistical information, and the list of cells accessible by the terminal device.

Figure 7:
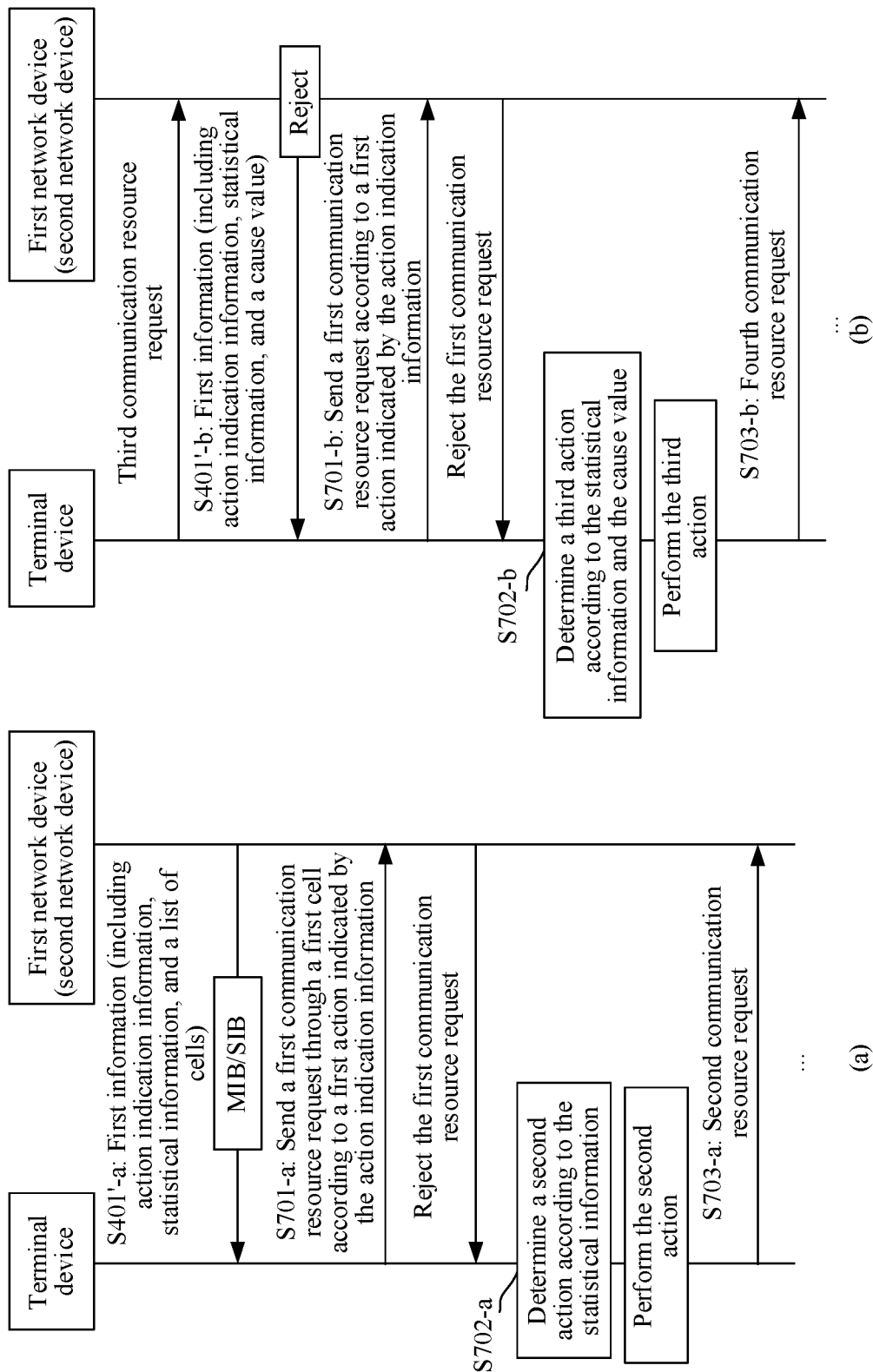
FIG. 7 is an exemplary flowchart of a method for acquiring a network resource in two scenarios according to an embodiment of the present application.

In this case, as shown in (a) in FIG. 7, the foregoing Step S402 may be specifically replaced with the following Step S701-a:

Step S701-a: The terminal device sends a first communication resource request to the second network device through a first cell according to a first action indicated by the action indication information.

The first cell is a cell in the list of cells accessible by the terminal device. The terminal device may determine the first cell from the list of cells according to one or more factors such as the signal strength, signal quality or cell load of a plurality of cells. The specific method and principle are not limited in the present application.

In a case that the second network device accepts the first communication resource request, the terminal device successfully acquires a network resource. In a case that the second network device rejects the first communication resource request, the terminal device performs, according to the statistical information, a second action, and sends a second communication resource request to the second network device. Details are shown in the following steps S702-a and S703-a.

S702-a: The terminal device determines a second action according to the statistical information.

It may be understood that the terminal device obtains the statistical information, so that the terminal device may know the status of processing a communication resource request by the second network device within the preset time period, for example, a state that the second network device accepts a communication resource request or a state that the second network device rejects a communication resource request. With the knowledge of the status of processing a communication resource request by the second network device within the preset time period, the terminal device may determine whether the second network device has a failure; and one or more of whether the failure is a software failure or a hardware failure, a node position of the failure, and severity of the failure if the second network device has the failure. With the knowledge of the status of the second network device, the terminal device decides what action to take to increase a possibility of successfully acquiring a communication resource.

For example, in a case that the statistical information includes the success ratio of acquiring a communication resource by the terminal device through retries, the terminal device may determine, according to whether the success ratio of acquiring a communication resource by the terminal device through retries satisfies a preset threshold, whether to perform retries to acquire a communication resource.

In another example, in a case that the statistical information includes the severity assessment value F of the network failure of the second network device within the preset time period, the terminal device may determine, according to whether the severity assessment value F of the network failure is greater than a preset threshold, whether to change a cell to send a communication resource request.

It should be noted that the foregoing method is only used as an example. The specific principle and method of determining the second action by the terminal device according to the statistical information are not limited in the embodiments of the present application.

S703-a: The terminal device performs a second action, and sends a second communication resource request to the second network device.

The second communication resource request is used for acquiring a second communication resource. The second communication resource and the first communication resource are used for providing the same communication service.

In a case that the second network device accepts the second communication resource request, the terminal device successfully acquires a network resource. In a case that the second network device rejects the second communication resource request, the terminal device determines an action again according to the statistical information, and sends a communication resource request to the second network device again after performing the action. For details, reference may be made to the foregoing process of steps S702-a and S703-a.

Further, in some other embodiments, in a case that the first information is sent to the terminal device while the second network device rejects the third communication resource request of the terminal device, the first information may further include a cause value. For example, the first network device and the second network device are the same device, and the first information includes the action indication information, the statistical information, and the cause value. As shown in (b) in FIG. 7, the foregoing Step S401 may be replaced with S401'-b:

S401'-b: The first network device sends first information to the terminal device. The first information includes the action indication information, the statistical information, and the cause value.

The cause value is used for representing a cause why the second network device rejects the third communication resource request. The cause value may include a main cause and a sub cause. The main cause may include, but not limited to, a capability of the terminal device, a capability of the network device, a permission of the terminal device, sufficiency of a communication resource, capability, network congestion, a resource preemption policy, a priority, and signal strength/signal quality. The sub cause is further division of the cause of a failure. For example, the sub cause may be a cause inside the network device or may be a problem of an interface between network elements. For example, if a failure is returned by the AMF network element, the sub cause may be a cause inside the AMF network element or may be a problem of an interface between the AMF network element and another network element, for example, an interface such as N12 or N22 shown in (a) in FIG. 1.

In the present application, the sub cause may be carried in a newly added field. For example, in the RRC message, the first information may be carried in the following message:

```
DL-CCCH-MessageType ::= SEQUENCE {
  C1 CHOICE {
    rrcReject RRCReject,
    rrcSetup RRCSetup,
    spare2 NULL,
    spare1 NULL
  },
  MessageClassExtension SEQUENCE {
    rrcCureAction RRCCureAction, //newly added field (action indication information)
    rrcFailRatio RRCFailRation, //newly added field (sub cause)
    rrcFailOtherInfo RRCFailInfo //newly added field (statistical information)
  }
}.
```

In another example, in the MIB message, the first information may be carried in the following message:

```
MIB ::= SEQUENCE {
  systemFrameNumber BIT STRING (SIZE (6)),
  subCarrierSpacingCommon ENUMERATED {scs15or60, scs30or120},
  ssb-SubcarrierOffset INTEGER (0..15),
  dmrs-TypeA-Position ENUMERATED {pos2, pos3},
  pdcch-ConfigSIB1 PDCCH-ConfigSIB1,
  cellBarred ENUMERATED {barred, notBarred},
  intraFreqReselection ENUMERATED {allowed, notAllowed},
  spare BIT STRING (SIZE (1)),
  cellCureAction INTEGER (0..15), //newly added field (action indication information)
  cellFailRatio INTEGER, //newly added field (sub cause)
  cellFailOtherInfo INTEGER //newly added field (statistical information)
}.
```

In another example, in the Attach scenario, the first information may be carried in the following message:

```
MSG ::= SEQUENCE {
  emmCause CHOICE {
    cause value shown below
  }
  emmFailInfo SEQUENCE{
    emmCureAction INTEGER (0..15), //newly added field (action indication information)
    emmFailRatio INTEGER, //newly added field (sub cause)
    emmFailOtherInfo INTEGER //newly added field (statistical information)
  }
}.
```

In another example, in the PDP activation scenario, the first information may be carried in the following message:

```
MSG ::= SEQUENCE {
  esmCause CHOICE {
    cause value shown in FIG. 8
  }
  esmFailInfo SEQUENCE{ //newly added field
    esmCureAction INTEGER (0..15), //newly added field (action indication information)
    esmFailRatio INTEGER, //newly added field (sub cause)
    esmFailOtherInfo INTEGER //newly added field (statistical information)
  }
}.
```

For example, the cause value may use an octet (octet) to represent 1 octet=8 bits. FIG. 8 shows a correspondence relationship between a cause value and a cause. As shown in FIG. 8, a cause value 11000000 is used for representing an invalid terminal device; a cause value 10100000 is used for representing that a permanent equipment identifier (permanent equipment identifier, PEI) is not accepted; a cause value 01100000 is used for representing invalid mobile equipment (mobile equipment, ME); a cause value 11100000 is used for representing that a 5G service is not allowed; a cause value 11100000 is used for representing that a network cannot recognize a terminal device; a cause value 10010000 is used for representing that a user is logged out; a cause value 11010000 is used for representing that a PLMN service is not allowed; a cause value 00110000 is used for representing that a tracking area (tracking area, TA) is not allowed; a cause value 10110000 is used for representing that roaming in a tracking area (tracking area) is not allowed; and 1111000 is used for representing that there is no suitable cell (suitable cell) in a tracking area (tracking area).

It should be noted that FIG. 8 is only used as an example. Examples are not exhausted in the present application. In addition, a cause value and a correspondence relationship between the cause value and a specific cause in the embodiments of the present application are not limited in the present application. For details, reference may be made to specifications in 3GPP standards or specifications in other conventional technologies.

In this case, as shown in (b) in FIG. 7, the foregoing Step S402 may be specifically replaced with the following Step S701-*b*:

S701-*b*: The terminal device sends a first communication resource request to the second network device according to the first action indicated by the action indication information.

For example, for a network failure of a PDP activation failure, a cause of the failure is: the terminal device carries a 5G capability, and a bearer fails to be established between a core network and a base station, leading to the PDP activation failure. The first information sent by the second network device to the terminal device includes a cause value shown in (a) in FIG. 9: 130 (that is, a timeout failure); a sub cause: N2 timeout; action indication information: Only 4G; and statistical information: success ratio 0% (that is, the success ratio of acquiring a communication resource by the terminal device through retries). After receiving the first information of the second network device, the terminal device performs the first action indicated by the action indication information, that is, changes an access technology, and accesses a network through 4G and sends the first communication resource request to the second network device.

In a case that the second network device accepts the first communication resource request, the terminal device successfully acquires a network resource. In a case that the second network device rejects the first communication resource request, as shown in (b) in FIG. 7, the terminal device performs, according to the statistical information and the cause value in the first information, a third action, and sends a fourth communication resource request to the second network device. Details are shown in the following steps S702-*b* and S703-*b*.

S702-*b*: The terminal device determines a third action according to the statistical information and the cause value.

It may be understood that the terminal device obtains the statistical information, so that the terminal device may know the status of processing a communication resource request by the second network device within the preset time period, for example, a state that the second network device accepts a communication resource request or a state that the second network device rejects a communication resource request. With the knowledge of the status of processing a communication resource request by the second network device within the preset time period, the terminal device may determine whether the second network device has a failure; and one or more of whether the failure is a software failure or a hardware failure, a node position of the failure, and severity of the failure if the second network device has the failure. With the knowledge of the status of the second network device, the terminal device decides what action to take to increase a possibility of successfully acquiring a communication resource.

For example, the cause value represents that the cause why the second network device rejects the first communication resource request is a capability of the network device, and the statistical information includes that the success ratio of acquiring a communication resource by the terminal device through retries is 0%. In this case, the terminal device determines that the third action is changing a cell and/or changing an access technology and sending a communication resource request.

In another example, the cause value represents that the cause why the second network device rejects the first communication resource request is network congestion, and the statistical information includes the severity assessment value F of the network failure of the second network device within the preset time period. In this case, the terminal device determines that the third action is lowering a capability of the terminal device, turning off one or more functions of the terminal device or changing a parameter of the communication resource request and sending a communication resource request.

It should be noted that the foregoing method is only used as an example. The specific principle and method of determining the third action by the terminal device according to the statistical information and the cause value are not limited in the embodiments of the present application.

S703-*b*: The terminal device performs a third action, and sends a fourth communication resource request to the second network device.

The fourth communication resource request is used for acquiring a fourth communication resource. The fourth communication resource and the first communication resource are used for providing the same communication service.

In a case that the second network device accepts the fourth communication resource request, the terminal device successfully acquires a network resource. In a case that the second network device rejects the fourth communication resource request, the terminal device determines an action again according to the statistical information, and sends a communication resource request to the second network device again after performing the action. For details, reference may be made to the foregoing process of steps S702-*b* and S703-*b*.

Figure 9A:
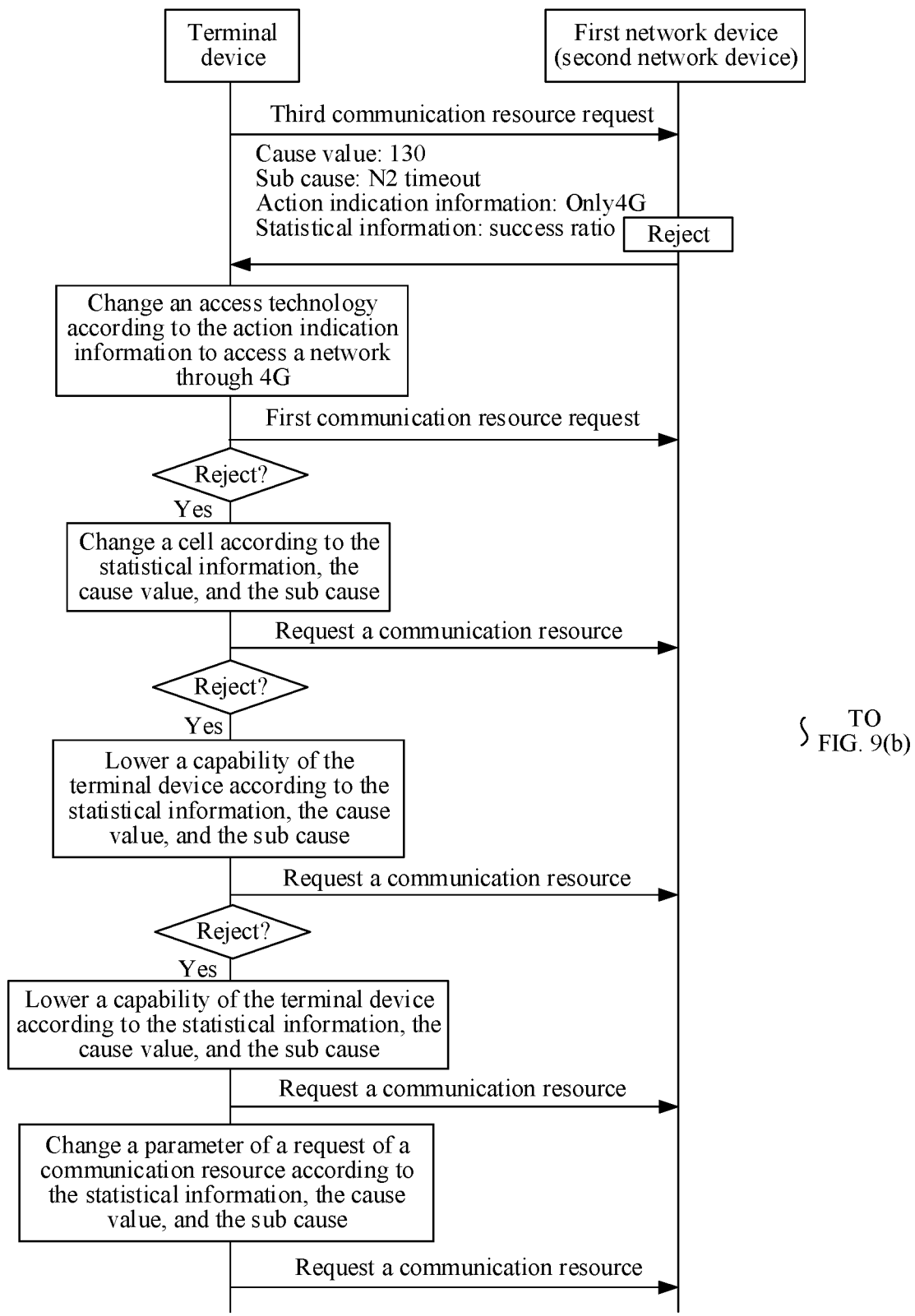
FIG. 9 is an exemplary diagram of two methods for acquiring a network resource according to an embodiment of the present application.
Figure 9B:
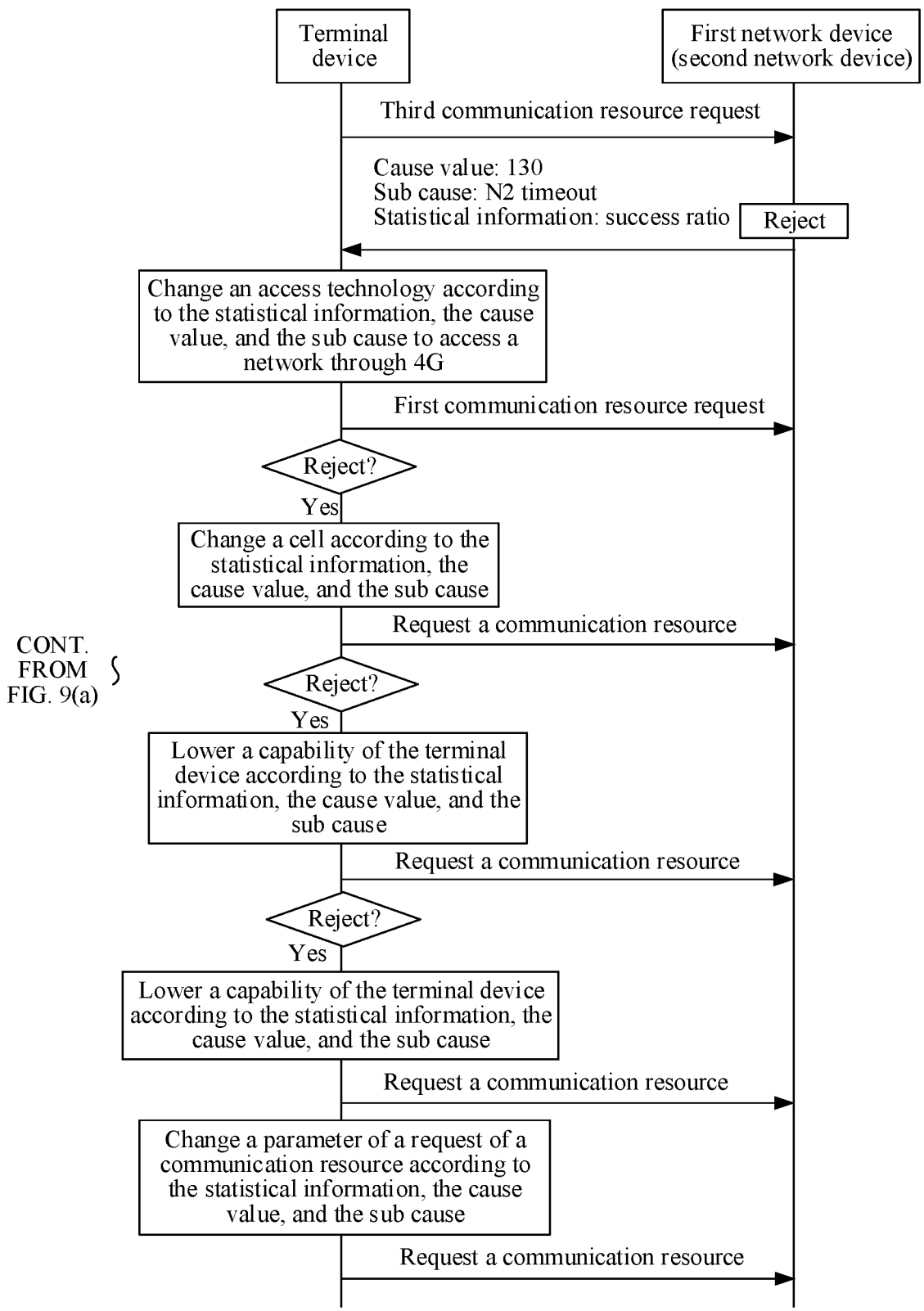

As shown in (a) in FIG. 9, in a case that the terminal device changes an access technology, and accesses a network through 4G and sends the first communication resource request to the second network device, and the second network device rejects the first communication resource request of the terminal device, the terminal device determines, based on the statistical information, that the success ratio of acquiring a communication resource by the terminal device through retries is 0%. In this case, as shown in (a) in FIG. 9, the terminal device sequentially changes a cell, lowers a capability of the terminal device, turns off one or more functions of the terminal device or changes a parameter of the communication resource request and requests a communication resource from the second network device, until the terminal device successfully acquires a communication resource.

For example, the first network device and the second network device are the same device, and the first information includes the statistical information and the cause value. The foregoing step S401 may be replaced with that the first network device sends the first information to the terminal device. The first information includes the statistical information and the cause value.

For example, for a network failure of a PDP activation failure, a cause of the failure is: the terminal device carries a 5G capability, and a bearer fails to be established between a core network and a base station, leading to the PDP activation failure. The first information sent by the second network device to the terminal device includes a cause value shown in (b) in FIG. 9: 130 (that is, a timeout failure); a sub cause: N2 timeout; and statistical information: success ratio 0% (that is, the success ratio of acquiring a communication resource by the terminal device through retries). After receiving the first information of the second network device, the terminal device determines, based on the statistical information, that the success ratio of acquiring a communication resource by the terminal device through retries is 0%. In this case, as shown in (b) in FIG. 9, the terminal device sequentially changes an access technology to 4G access, changes a cell, lowers a capability of the terminal device, turns off one or more functions of the terminal device or changes a parameter of the communication resource request and requests a communication resource from the second network device, until the terminal device successfully acquires a communication resource.

It should be understood that the solutions in the embodiments of the present application may be used in appropriate combinations, and the interpretation or description of the terms appearing in the embodiments may be cross-referenced or interpreted in the various embodiments. This is not limited.

It should be understood that sequence numbers of the foregoing processes do not mean execution sequences in various embodiments of the present application. The execution sequences of the processes should be determined according to functions and internal logic of the processes, and should not be construed as any limitation on the implementation processes of the embodiments of the present application.

It may be understood that to implement the foregoing functions in any embodiment, the terminal device and the network device (for example, the first network device or the second network device) includes hardware structures and/or software modules corresponding to execution of the functions. A person skilled in the art should be easily aware that, in combination with the units and algorithm steps of the examples described in the embodiments disclosed in this specification, the present application can be implemented by hardware or a combination of hardware and computer software. Whether a function is performed by hardware or computer software driving hardware depends on particular applications and design constraints of the technical solutions. A person skilled in the art may use different methods to implement the described functions for each particular application, but it should not be considered that the implementation goes beyond the scope of the present application.

In the embodiments of the present application, functional modules of the terminal device and the network device (for example, the first network device or the second network device) may be divided. For example, functional modules may be divided corresponding to functions, or two or more functions may be integrated into one processing module. The integrated module may be implemented in the form of hardware, or may be implemented in the form of a software functional module. It should be noted that module division in this embodiment of the present application is an example and is merely logical function division. During actual implementation, there may be another division manner.

Figure 10:
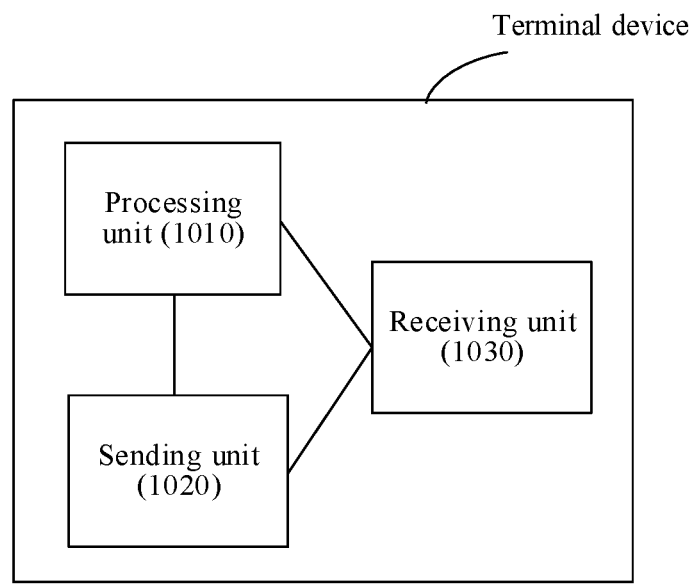
FIG. 10 is a structural block diagram of a terminal device according to an embodiment of the present application.

For example, in a case that functional modules are obtained through division in an integrated manner, FIG. 10 is a structural block diagram of a terminal device according to an embodiment of the present application. The terminal device may include a processing unit 1010, a sending unit 1020, and a receiving unit 1030.

The receiving unit 1030 is configured to support that the terminal device performs the foregoing steps S401, S401'-a, and S401'-b or receives information of rejecting the first communication resource request, and/or performs other related processes in the embodiments of the present application. The sending unit 1020 is configured to support that the terminal device performs the foregoing steps S402, S701-a, S701-b, S703-a, and S703-b or sends the third communication resource request to the first network device, and/or performs other related processes in the embodiments of the present application. The processing unit 1010 is configured to support that the terminal device performs the foregoing steps S702-a and S702-b or performs a second action or performs a third action, and/or performs other related processes in the embodiments of the present application.

Figure 11:
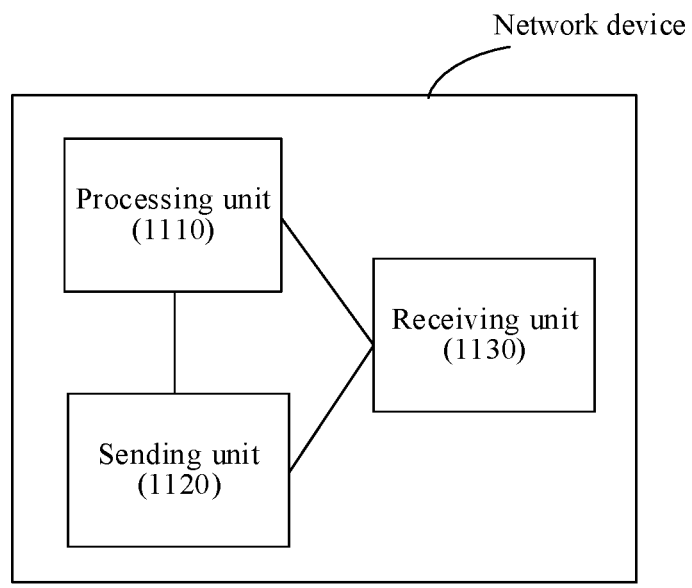
FIG. 11 is a structural block diagram of a network device according to an embodiment of the present application.

In another example, in a case that functional modules are obtained through division in an integrated manner, FIG. 11 is a structural block diagram of a network device according to an embodiment of the present application. A terminal device may be a first network device or a second network device. The network device includes a processing unit 1110, a sending unit 1120, and a receiving unit 1130.

The sending unit 1120 is configured to support that the network device performs the foregoing steps S401, S401'-a, and S401'-b or sends information of rejecting the first communication resource request, and/or performs other related processes in the embodiments of the present application. The receiving unit 1130 is configured to support that the network device performs the foregoing steps S402, S701-a, S701-b, S703-a, and S703-b or receives the third communication resource request, and/or performs other related processes in the embodiments of the present application. The processing unit 1110 is configured to generate first information, and control the sending unit 1120 and the receiving unit 1130 to perform the foregoing steps, and/or perform other related processes in the embodiments of the present application.

It should be noted that the foregoing sending unit 1020, receiving unit 1030, sending unit 1120, and receiving unit 1130 may include a radio frequency circuit. The terminal device or network device may send and receive a radio signal by using the radio frequency circuit. Generally, the radio frequency circuit includes, but is not limited to, an antenna, at least one amplifier, a transceiver, a coupler, a low noise amplifier, a duplexer, and the like. In addition, the radio frequency circuit may communicate with another device through wireless communication. Any communication standard or protocol may be used for the wireless communication, and includes, but is not limited to, a Global System for Mobile Communications, a general packet radio service, Code Division Multiple Access, Wideband Code Division Multiple Access, Long Term Evolution, an email, an SMS message service, and the like.

In an optional manner, when software is used to implement data transmission, implementation may be entirely or partially performed in the form of a computer program product. The computer program product includes one or more computer instructions. When the computer program instructions are loaded and executed on a computer, all or some of the processes or functions in the embodiments of the present application are implemented. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The available medium may be a magnetic medium (such as a floppy disk, a hard disk, or a magnetic tape), an optical medium (such as a digital video disc (digital video disc, DVD)), a semiconductor medium (such as a solid state disk (solid state disk, SSD)) or the like.

Methods or algorithm steps described in combination with the embodiments of the present application may be implemented by hardware, or may be implemented by a processor by executing a software instruction. The software instruction may be constituted by corresponding software modules, and the software modules may be stored in a RAM, a flash, a ROM, an EPROM, an EEPROM, a register, a hard disk, a removable hard disk, a CD-ROM, or any other storage medium known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a detection apparatus. Certainly, the processor and the storage medium may alternatively exist in the device as discrete components.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented as required, that is, an inner structure of an apparatus is divided into different functional modules to implement all or part of the functions described above.

In an optional manner, the present application provides a chip system, including a processor and a memory, where the memory stores computer program code, and when executed by the processor, the computer program code implements the method in any possible implementation provided in the present application. The chip system may include a chip, or may include a chip and another discrete device.

In the several embodiments provided in the present application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be omitted or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected according to actual needs to achieve the objectives of the solutions of the embodiments.

In addition, functional units in the embodiments of the present application may be integrated into one processing unit, or each of the units may be physically separated, or two or more units may be integrated into one unit. The integrated unit may be implemented in the form of hardware, or may be implemented in the form of a software functional unit.

When the integrated unit is implemented in the form of a software functional unit and sold or used as an independent product, the integrated unit may be stored in a readable storage medium. Based on such an understanding, the technical solutions in the embodiments of the present application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of the present application. The storage medium includes various media that may store processing code, such as a USB flash drive, a removable hard disk, a ROM, a RAM, a magnetic disk, and an optical disc.

The foregoing descriptions are merely specific implementations of the present application, but are not intended to limit the protection scope of the present application. Any variation or replacement within the technical scope disclosed in the present application shall fall within the protection scope of the present application. Therefore, the protection scope of the present application shall be subject to the protection scope of the claims.

What is claimed is:

1. A first network device, comprising:
    a memory, configured to store a computer program;
    a transceiver, configured to receive or transmit a radio signal; and
    a processor, configured to execute the computer program to implement the following steps for acquiring a network resource:
    sending, by a first network device, first information to a terminal device when a second network device rejects the communication resource request of the terminal device;
    the first information includes action indication information, which is used to instruct the terminal device to perform a first action to request communication resources from the second network device; or
    the first information includes statistical information, which is used to represent at least one or more of the following: a status of receiving and processing a communication resource request by the second network device within a preset time period, or a status of a network failure of the second network device within the preset time period; the statistical information is used for the terminal device to determine the first action and execute the first action;
    wherein, the first action includes: sending the first communication resource request to the second network device after one or more of the following operations are performed: lowering a capability of the terminal device, turning off one or more functions of the terminal device, changing a cell, changing an access technology, or changing a parameter of the communication resource request; the first communication resource request is used to obtain the first communication resource.

2. The first network device according to claim 1, wherein before the sending, by a first network device, first information to a terminal device, the method further comprises:
    obtaining, by the first network device, the first information according to historical data of receiving and processing a communication resource request by the second network device within the preset time period.

3. The first network device according to claim 1, wherein the statistical information comprises at least one piece of the following information within the preset time period:
    a count of terminal devices that send a communication resource request to the second network device;
    a count of terminal devices whose communication resource request is rejected by the second network device;
    a ratio of terminal devices whose communication resource request is rejected by the second network device;
    a count of communication resource requests received by the second network device;
    a count of communication resource requests rejected by the second network device;
    a ratio of communication resource requests rejected by the second network device;
    an average request time distance of receiving a communication resource request by the second network device;
    an average rejection time distance of rejecting a communication resource request by the second network device;
    an average request time interval of communication resource requests received by the second network device; or
    an average rejection time interval of rejecting communication resource requests by the second network device.

4. The first network device according to claim 1, wherein the first action indicated by the action indication information is to acquire a communication resource through retries, and the statistical information is further used for representing a success ratio of acquiring a communication resource by the terminal device through retries.

5. A method for acquiring a network resource, comprising:
    receiving, by a terminal device, first information from a first network device, and the first information is sent to the terminal device by the first network device when a second network device rejects the communication resource request of the terminal device;
    the first information includes action indication information; the action indication information is used to instruct the terminal device to perform a first action to request communication resources from the second network device; or the first information includes statistical information, which is used to represent at least one or more of the following: a status of receiving and processing a communication resource request by the second network device within a preset time period, or a status of a network failure of the second network device within the preset time period; the statistical information is used for the terminal device to determine the first action and execute the first action;

wherein, the first action includes: sending a first communication resource request to the second network device after performing one or more of the following operations: lowering a capability of the terminal device, turning off one or more functions of the terminal device, changing a cell, changing an access technology, or changing a parameter of the communication resource request; the first communication resource request is used to obtain the first communication resource.

6. The method according to claim 5, wherein the first information includes the statistical information; the method further comprises:

in a case that the first communication resource request is rejected by the second network device, performing, by the terminal device according to the statistical information, a second action, and sending a second communication resource request to the second network device, wherein the second communication resource request is used for acquiring a second communication resource, and the second communication resource and the first communication resource are used for providing the same communication service, wherein the second action comprises one or more of lowering a capability of the terminal device, turning off one or more functions of the terminal device, changing a cell, changing an access technology, or changing a parameter of the communication resource request.

7. The method according to claim 6, wherein the performing, by the terminal device according to the statistical information, a second action, and sending a second communication resource request to the second network device comprises:

determining, by the terminal device, a failure type of the second network device according to the statistical information;

in a case that the failure type represents that the second network device has neither a hardware failure nor a software failure, sending, by the terminal device, the second communication resource request to the second network device according to a preset period; and in a case that the failure type represents that the second network device has a hardware failure or a software failure, performing, by the terminal device, the second action according to the failure type, and sending the second communication resource request to the second network device.

8. The method according to claim 6, wherein the first information further comprises a cause value; the cause value is used for representing a cause why the second network device rejects the communication resource request of the terminal device.

9. The method according to claim 8, wherein the first information comprises the statistical information, and the method further comprises:

in a case that the terminal device fails to acquire the first communication resource through the first communication resource request, performing, by the terminal device according to the statistical information and the cause value, a third action, and sending a fourth communication resource request to the second network device, wherein the fourth communication resource request is used for acquiring a fourth communication resource, and the fourth communication resource and the first communication resource are used for providing the same communication service, wherein the third action comprises one or more of lowering a capability of the terminal device, turning off one or more functions of the terminal device, changing a cell, changing an access technology, or changing a parameter of the communication resource request.

10. The method according to claim 9, wherein the performing, by the terminal device according to the statistical information and the cause value, a third action, and sending a fourth communication resource request to the second network device comprises:

determining, by the terminal device, the failure type of the second network device according to the statistical information and the cause value;

in a case that the failure type represents that the second network device has neither a hardware failure nor a software failure, sending, by the terminal device, the fourth communication resource request to the second network device according to a preset period;

in a case that the failure type represents that the second network device has a hardware failure or a software failure, performing, by the terminal device, the third action according to the failure type; and sending, by the terminal device, the fourth communication resource request to the second network device.

11. The method according to claim 10, wherein the statistical information comprises at least one piece of the following information within the preset time period:

a count of terminal devices that send a communication resource request to the second network device;

a count of terminal devices whose communication resource request is rejected by the second network device;

a ratio of terminal devices whose communication resource request is rejected by the second network device;

a count of communication resource requests received by the second network device;

a count of communication resource requests rejected by the second network device;

a ratio of communication resource requests rejected by the second network device;

an average request time distance of receiving a communication resource request by the second network device;

an average rejection time distance of rejecting a communication resource request by the second network device;

an average request time interval of communication resource requests received by the second network device; or an average rejection time interval of rejecting communication resource requests by the second network device.

12. The method according to claim 11, wherein the statistical information comprises:

a severity assessment value of the network failure of the second network device within the preset time period.

13. A terminal device, comprising:
a memory, configured to store a computer program;
a transceiver, configured to receive or transmit a radio signal; and
a processor, configured to execute the computer program to implement the following steps for acquiring a network resource:
receiving, by a terminal device, first information from a first network device, and the first information is sent to the terminal device by the first network device when a second network device rejects the communication resource request of the terminal device;
the first information includes action indication information; the action indication information is used to instruct the terminal device to perform a first action to request communication resources from the second network device; or
the first information includes statistical information, which is used to represent at least one or more of the following: a status of receiving and processing a communication resource request by the second network device within a preset time period, or a status of a network failure of the second network device within the preset time period; the statistical information is used for the terminal device to determine the first action and execute the first action;
wherein, the first action includes: sending a first communication resource request to the second network device after performing one or more of the following operations: lowering a capability of the terminal device, turning off one or more functions of the terminal device, changing a cell, changing an access technology or changing a parameter of the communication resource request; the first communication resource request is used to obtain the first communication resource.

14. The terminal device according to claim 13, wherein the first information includes the statistical information; the method further comprises:
in a case that the first communication resource request is rejected by the second network device, performing, by the terminal device according to the statistical information, a second action, and sending a second communication resource request to the second network device, wherein the second communication resource request is used for acquiring a second communication resource, and the second communication resource and the first communication resource are used for providing the same communication service,
wherein the second action comprises one or more of lowering a capability of the terminal device, turning off one or more functions of the terminal device, changing a cell, changing an access technology, or changing a parameter of the communication resource request.

15. The terminal device according to claim 14, wherein the performing, by the terminal device according to the statistical information, a second action, and sending a second communication resource request to the second network device comprises:
determining, by the terminal device, a failure type of the second network device according to the statistical information;
in a case that the failure type represents that the second network device has neither a hardware failure nor a software failure, sending, by the terminal device, the second communication resource request to the second network device according to a preset period; and in a case that the failure type represents that the second network device has a hardware failure or a software failure, performing, by the terminal device, the second action according to the failure type, and sending the second communication resource request to the second network device.

16. The terminal device according to claim 14, wherein the first information further comprises a cause value; the cause value is used for representing a cause why the second network device rejects the communication resource request of the terminal device.

17. The terminal device according to claim 16, wherein the first information comprises the statistical information, and the method further comprises:
in a case that the terminal device fails to acquire the first communication resource through the first communication resource request, performing, by the terminal device according to the statistical information and the cause value, a third action, and sending a fourth communication resource request to the second network device, wherein the fourth communication resource request is used for acquiring a fourth communication resource, and the fourth communication resource and the first communication resource are used for providing the same communication service,
wherein the third action comprises one or more of lowering a capability of the terminal device, turning off one or more functions of the terminal device, changing a cell, changing an access technology, or changing a parameter of the communication resource request.

18. The terminal device according to claim 17, wherein the performing, by the terminal device according to the statistical information and the cause value, a third action, and sending a fourth communication resource request to the second network device comprises:
determining, by the terminal device, the failure type of the second network device according to the statistical information and the cause value;
in a case that the failure type represents that the second network device has neither a hardware failure nor a software failure, sending, by the terminal device, the fourth communication resource request to the second network device according to a preset period;
in a case that the failure type represents that the second network device has a hardware failure or a software failure, performing, by the terminal device, the third action according to the failure type; and
sending, by the terminal device, the fourth communication resource request to the second network device.

19. The terminal device according to claim 18, wherein the statistical information comprises at least one piece of the following information within the preset time period:
a count of terminal devices that send a communication resource request to the second network device;
a count of terminal devices whose communication resource request is rejected by the second network device;
a ratio of terminal devices whose communication resource request is rejected by the second network device;
a count of communication resource requests received by the second network device;
a count of communication resource requests rejected by the second network device;
a ratio of communication resource requests rejected by the second network device;

an average request time distance of receiving a communication resource request by the second network device;

an average rejection time distance of rejecting a communication resource request by the second network device;

an average request time interval of communication resource requests received by the second network device; or an average rejection time interval of rejecting communication resource requests by the second network device.

20. The terminal device according to claim 19, wherein the statistical information comprises:

a severity assessment value of the network failure of the second network device within the preset time period.

* * * * *